US008594368B1

(12) United States Patent
Sim et al.

(10) Patent No.: US 8,594,368 B1
(45) Date of Patent: Nov. 26, 2013

(54) SENSE/CONTROL DEVICES, CONFIGURATION TOOLS AND METHODS FOR SUCH DEVICES, AND SYSTEMS INCLUDING SUCH DEVICES

(75) Inventors: Harry Sim, San Jose, CA (US); Steve Y. Kim, San Jose, CA (US); Marcus Kramer, San Diego, CA (US)

(73) Assignee: Cypress Envirosystems, Inc., San Jose, CA (US)

( * ) Notice: Subject to any disclaimer, the term of this patent is extended or adjusted under 35 U.S.C. 154(b) by 122 days.

(21) Appl. No.: 13/425,257

(22) Filed: Mar. 20, 2012

Related U.S. Application Data

(60) Division of application No. 12/214,171, filed on Jun. 16, 2008, now Pat. No. 8,165,339, which is a continuation-in-part of application No. 11/644,332, filed on Dec. 21, 2006, now Pat. No. 8,411,896.

(60) Provisional application No. 60/944,169, filed on Jun. 15, 2007.

(51) Int. Cl.
*G06K 9/00* (2006.01)

(52) U.S. Cl.
USPC .............................. 382/100; 348/160; 702/104

(58) Field of Classification Search
USPC ......... 382/100, 152; 348/160; 700/11, 12, 17; 702/104, 116, 188; 340/870.02, 340/870.04, 3.1, 3.3, 3.31, 3.32
See application file for complete search history.

(56) References Cited

U.S. PATENT DOCUMENTS

| | | | | |
|---|---|---|---|---|
| 5,870,140 | A | * | 2/1999 | Gillberry ...................... 348/160 |
| 2005/0203641 | A1 | * | 9/2005 | Manner ......................... 700/12 |
| 2007/0057814 | A1 | * | 3/2007 | Goldberg et al. ........ 340/870.02 |

* cited by examiner

*Primary Examiner* — Andrew W Johns
(74) *Attorney, Agent, or Firm* — Manuel de la Cerra

(57) ABSTRACT

A configuration tool including a memory to store instructions, communication circuitry, and a processor coupled to the memory and the communication circuitry. The processor is configured to execute instructions to communicate with a device attached to monitor or control a piece of equipment using the communication circuitry. The processor receives data about a state of the piece of equipment from the device, and transmits configuration data to the device. The configuration data is configured to control how additional data about the state of the piece of equipment is to be acquired.

26 Claims, 44 Drawing Sheets

The following will introduce the HH application used to configure a WGR. The application is broken into multiple tabs. Each tab will be highlighted below. To select a tab in the application, tap on the name using the stylus.

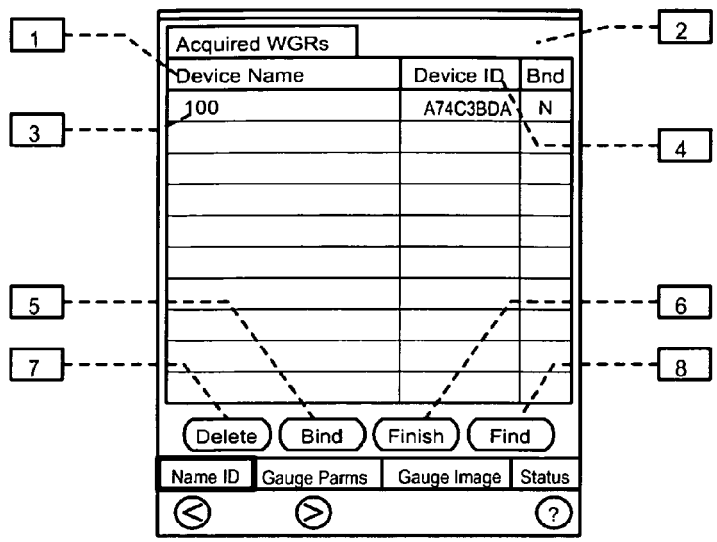

1. Device Name Column: This column contains the name of the WGR that the handheld is or has bound to. This is used to identify the WGR by name. Highlighting a WGR from the list will recall its parameters from the saved text file.
2. Bind Column: This column shows the connection status between the WGR and the HH.
    - Blank -> HH cannot detect WGR
    - "N" -> HH detected the WGR but they are not connected
    - "Y" -> HH and WGR are connected
3. Name Entry: You can select, enter or edit the name of a WGR here. To select a WGR tap on the name with the stylus. To enter or edit the name, first select the WGR, the click on the name once more with the stylus. The entry field will transition to edit mode. Make any changes then press [Enter/ON] key or tap anywhere else on the screen with the stylus to exit the edit mode.
4. Device ID: This column contains the unique radio ID of the WGR. This is used to identify the WGR you wish to connect to when the HH has detected more than one. The WGR displays its radio ID on its LCD.
5. Bind Button: Used to connect the HH to the highlighted WGR in the Device Name column.
6. Finish Button: Terminates connection between the HH and WGR. Use this button when you have completed configuration and want the WGR to save all the settings. The WGR will not save its configuration settings if the connection were terminated any other way.
7. Delete Button: Will delete the highlighted WGR in the Device Name column.

FIG. 16B

Gauge Parameters Tab - Page 1

| | | |
|---|---|---|
| Node ID | 255 | 1 |
| RF Frequency A | 74 | 2 |
| RF Frequency B | 2 | 3 |
| Sample Rate (sec) | 300 | 4 |
| Units (0=psi, 1=InH20, 2=degF, 3=InHg) | 0 | 5 |
| Min Gauge Value | 0 | 6 |
| Max Gauge Value | 100 | 7 |
| Zoom Enable | 0 | 8 |
| Long Tail Enable | 1 | 9 |
| Taper and Short Tail En | 0 | 10 |
| Dynamic Stitching En | 0 | 11 |
| Second Radius Ignore | 5 | 12 |

Name ID | Gauge Parms | Gauge Image | Status (Def) (?)

1. Node ID: The unique ID of the WGR within its wireless network.
2. RF Frequency A: The A channel used for wireless communication.
3. RF Frequency B: The B channel used for wireless communication.
4. Sample Rate (sec): The time in seconds between samples when the WGR is in Normal Sample Mode.
5. Units: The units of data the gauge represents. 0="PSI", 1="H2O", 2="deg F", 3="inHg"
6. Min Gauge Value: Minimum value on the gauge scale.
7. Max Gauge Value: Maximum value on the gauge scale.
8. Zoom Enable: The camera will capture the image with a 2x zoom
9. Long Tail Enable: Specifies the type of needle. 1 means Long Tail Mode, 0 means Short Tail Mode.
10. Taper and Short Tail En: If enabled, WGR will also process the taper of a short tail needle to find the tip. Only valid for Short Tail Mode.
11. Dynamic Stitching En: Special mode used to find tip of a long tail needle with a slight taper. Note this mode can decrease battery life. Only valid for Long Tail Mode.
12. Second Radius Ignore: Specifics which circles ignore for angle calculations. All circles greater than or equal to this value will be ignored. Index starts at 0 with the innermost circle, e.g. 3 = means the second set of red pixels of circle 3&4 will not be used in the angle calculation. 5 = all sets of red pixels will be used. For Long Tail Mode this should be set to 5. For Short Tail Mode, set this based on the circles that only overlap the tip - usuallly 3.

FIG. 16D

Gauge Parameters Tab - Page 2

| Center Point X | 63 |
|---|---|
| Zoom X Offset | 0 |
| Center Point Y | 63 |
| Radius 1 | 30 |
| Radius 2 | 31 |
| Radius 3 | 32 |
| Radius 4 | 33 |
| Radius 5 | 34 |
| Exposure | 150 |
| Pixel Threshold | 80 |
| Tip Width | 2 |
| Tail Width | 10 |

| Name ID | Gauge Parms | Gauge Image | Status |

1. Center Point X: Defines the X dimension center of the needle.
2. Zoom X Offset: This offset will adjust the image frame right or left along the gauge face. Used only when Zoom En = 1. This is used to center the needle in the image. When used the Center Point X variable should always be set to 63.
3. Center Point Y: Defines the Y dimension center of the needle.
4. Radius 1: Innermost circle radius.
5. Radius 2: Circle 2 radius.
6. Radius 3: Circle 3 radius.
7. Radius 4: Circle 4 radius.
8. Radius 5: Outermost circle radius.
9. Exposure: This will adjust the brightness of the image. The larger the number the brighter the image.
10. Pixel Threshold: Defines the sensitivity of dark pixels stored. Decreasing the Luminosity Threshold will increase the number of pixels picked up. Increasing the Luminosity Threshold will decrease the number of pixels picked up.
11. Tip Width: The needle tip width in pixels.
12. Tail Width: The needle taile width in pixels.

FIG. 16E

Gauge Parameters Tab - Page 3

| | |
|---|---|
| Gauge Min Angle | 45 |
| Gauge Max Angle | 315 |
| Switching Angle | 35 |
| Needle Rest Corrector | 5 |
| Gauge Tilt Angle | 0 |
| (Reserved Units) | |
| (Second Blob En=1) | 1 |
| (Second Blob Line En=1) | 1 |
| (Receiver ID) | |

Name ID | Gauge Parms | Gauge Image | Status

Send   Get   Def

1. Gauge Min Angle: Angle, with respect to Gauge Bottom, at which the Min Gauge Value resides.
2. Gauge Max Angle: Angle, with respect to Gauge Bottom, at which the Max Gauge Value resides.
3. Switching Angle: Angle, with respect to Gauge Bottom, at which the gauge value will switch from Maximum to Minimum or vice versa. Must be between Gauge Min and Gauge Max Angle.
4. Needle Rest Correction: Offset angle from Gauge Min Angle where the value will always read Min Gauge Value. If the needle is between the Gauge Min Angle and Gauge Min Angle + Needle Rest corr, value will read Minimum.
5. Gauge Tilt Angle: The angle between the WGR and Gauge Bottom. Example: -30 = Gauge is -30 degrees counterclockwise. +30 Gauge is +30 clockwise.
6. (Reserved Units): Unused.
7. (Second Blob En=1): Should always be set to 1.
8. (Second Blob Line En=1): Should always be set to 1.
9. (Receiver ID): Unused.

FIG. 16F

| Repeater Bit | Type2 | Type1 | Type0 | (reserved) | Sequence Bit | Flag1 | Flag0 |
|---|---|---|---|---|---|---|---|

FIG. 26

| 0x00 | NodeID [4 bytes] | WGR Version [2 bytes] | Product ID [1 byte] |
|---|---|---|---|

FIG. 27

SENSE/CONTROL DEVICES, CONFIGURATION TOOLS AND METHODS FOR SUCH DEVICES, AND SYSTEMS INCLUDING SUCH DEVICES

RELATED APPLICATION

This application is a divisional of U.S. patent application Ser. No. 12/214,171, filed on Jun. 16, 2008 now U.S. Pat. No. 8,165,339, which claims the benefit of U.S. Provisional Application No. 60/944,169, filed on Jun. 15, 2007, and is a continuation-in-part of U.S. patent application Ser. No. 11/644,332, filed on Dec. 21, 2006 now U.S. Pat. No. 8,411,896, the contents of all are incorporated herein by reference

TECHNICAL FIELD

The present disclosure relates generally to devices and systems for monitoring or controlling equipment, and more particularly to devices and methods for transmitting status and/or control data from such equipment.

BACKGROUND

Many existing industrial sites were constructed with equipment having no capability of being automatically monitored or controlled. As a result, manpower may be required to periodically survey the equipment of the site. This may be time consuming and/or costly.

Still other sites may operate with outdated analog monitoring and control systems requiring wiring of control signals throughout the site (e.g., 0-5 volt, 0-10 volts, 0-15 volt, 4-20 mA DC type control systems). Such approaches may require constant maintenance of wiring and wiring conduits which may also be time consuming and costly.

Automated pieces of equipment are known. For example, pressure gauges have been manufactured with a built-in transmitting unit. However, such equipment may be very costly. Further, retrofitting an existing site with such equipment may be an invasive process. In the event the equipment to be replaced is being utilized in an active process, the process may have to be shut down entirely as the equipment is replaced with one having a built-in transmitting unit. Further, once such a replacement has taken place, the entire processing system may have to be retested (e.g., leak tested) to ensure it is properly operating. This makes automation of a site, expensive, time consuming and invasive.

DISCLOSURE OF INVENTION

The present invention may include a system for monitoring equipment in a non-invasive fashion may include at least one sense device comprising an electronics module that includes a image sensor, at least one controller coupled to receive image data from the image sensor and generate a reading value, a display that displays the reading value from the at least one controller. In addition, a mounting adapter, separate from and attachable to the electronics module, may be included that has a fitting portion adaptable to be affixed to the monitored equipment and an image opening that enables an image of the monitored equipment to be acquired. In other embodiments, a sense device may provide a signal, such as a DC signal from piece of equipment. A configuration tool may configure parameters by which a reading value is generated from such a DC signal. In one arrangement, a configuration tool may configure sense devices via a wireless connection, and display any images of the monitored equipment captured by the sense device. This may enable intuitive configuration of sense devices and/or quick confirmation of sense device readings.

BRIEF DESCRIPTION OF THE DRAWINGS

FIG. 6A-1 shows additional functions that may be included in a WGR embodiment.

FIG. 6B-0 is a blocks schematic if a non-imaging sense/control device according to an embodiment. FIG. 6B-1 is a diagram showing functions that may be included in an embodiment like that of FIG. 6B-0.

FIGS. 16A to 16H are diagrams showing a menu structure of a configuration tool according to an embodiment.

FIG. 26 shows an example of a wireless packet header according to an embodiment.

FIG. 27 shows an example of a broadcast packet format from a sense/control device according to an embodiment.

MODE(S) FOR CARRYING OUT THE INVENTION

Figure 1:
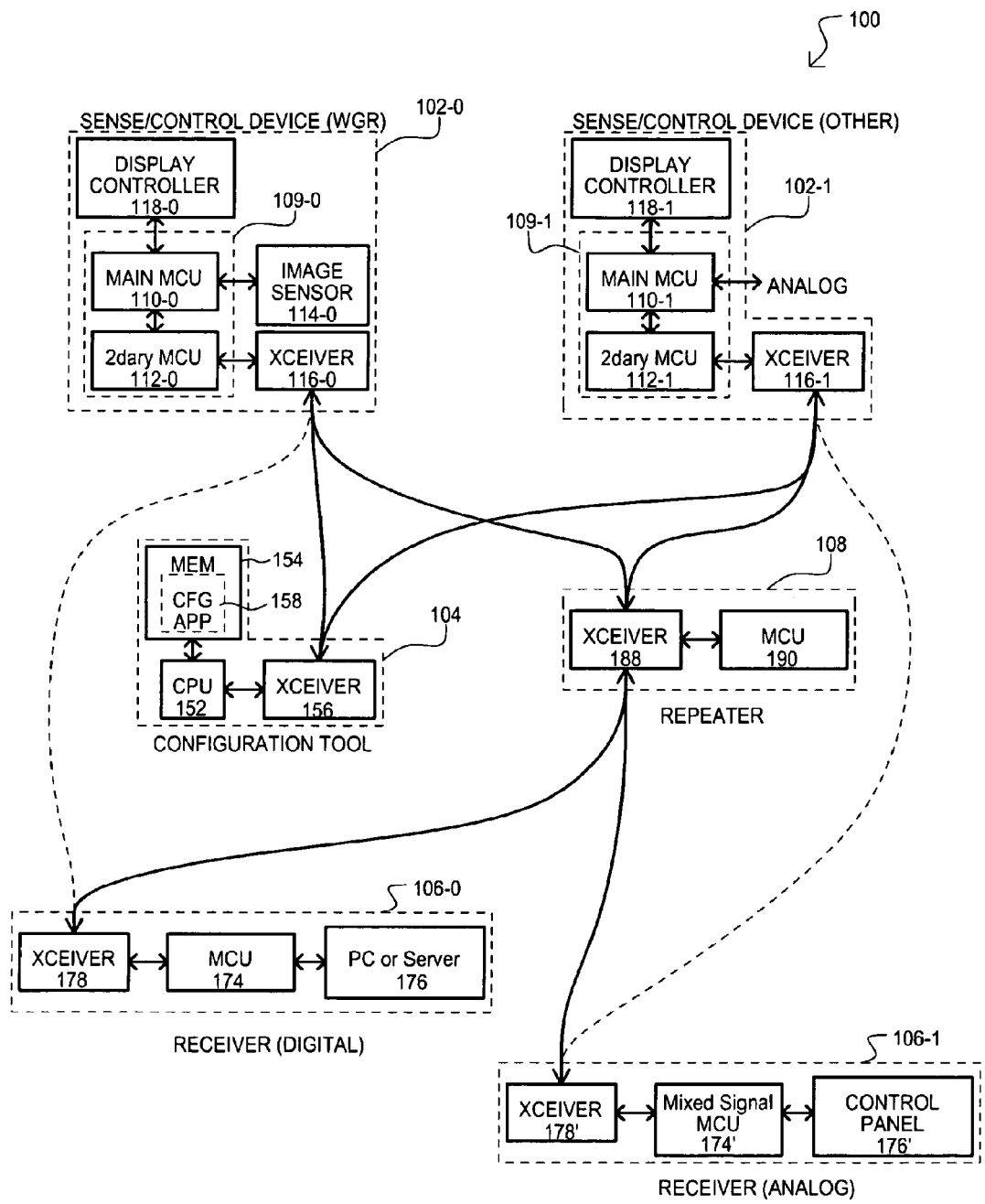
FIG. 1 shows a block diagram of a system according to one embodiment.

Various embodiments will now be described in detail that show devices for sensing or controlling one or more a pieces of equipment, and systems that incorporate such devices, including configuration tools and methods.

Sensing or control devices described herein may be attached to existing equipment and monitor or control the operation of such equipment. As but a few of the many possible examples, a sense device may determine a reading from another device, such as a gauge, temperature sensor, or some other transducer. A control device may actuate a piece of equipment, such as a solenoid or alarm (audio or visual). One very particular example of such a sensing or control device may be a wireless gauge reader (WGR). Examples of particular WGRs are shown in U.S. patent application Ser. No. 11/644,332, filed on Dec. 21, 2006 by co-inventor Harry Sim.

According to the embodiments shown herein, sensing or control devices may be attached to existing equipment in a quick and easy fashion. A configuration tool may configure the sensing or control device to transmit a reading representing the equipment operation, either directly, or by way of one or more signal repeaters. Such capabilities may allow an entire facility having existing legacy equipment to be quickly refitted for automatic monitoring without having to replace any of the equipment. Thus, such a modification of a facility may be essentially non-invasive. A process may continue to run as each piece of equipment is automated for monitoring and/or control.

In the following descriptions, apart from general reference characters ending with "00" like features are referred to with the same reference character but with a first digit corresponding to the figure.

System Components

Referring now to FIG. 1, one example of a system according to an embodiment is shown with components described as block schematic diagrams. A system 100 may include one or more sense/control devices (102-0 and/or 102-1), one or more configuration tools (one shown as 104), and one or more receivers (106-0 and/or 106-1). Optionally, a system 100 may include one or more repeaters (one shown as 108).

A sense/control device (102-0 or 102-1) may be physically attached to another piece of equipment, and may be capable of determining a state of that piece of equipment. In the very particular example of FIG. 1, a sense/control device 102-0 may be a WGR that may be attached to a corresponding gauge having a face intended for a visual reading by a person. A WGR 102-0 may capture an image of such gauge face, and convert such an image into a gauge reading. Such a reading may then be transmitted to a receiver (e.g., 106-0 and/or 106-1) to monitor the gauge and/or control operations based on a value provided by the gauge.

However, alternate embodiments may include a sense/control device 102-1 that may determine a state of a piece of equipment from inputs other than an image. In addition, a sense/control device 102-1 may output values to the equipment to change a state of the equipment (e.g., activate a switching device).

A configuration tool 104 may communicate with a sense/control device 102-0/1 and assign various configuration values to a sense/control device 102-0/1. In one embodiment, such configuration values may include communication configuration values, format and control values, and acquisition configuration values. Communication configuration values may enable a sense/control device 102-0/1 to communicate with one or more receivers (e.g., 106-0/1), either directly or via a repeater 108. Format and control values may assign units to a reading (e.g., psi, etc.), a decimal point location, and/or reading limits utilized to generate an alarm by a sense/control device 102-0/1. Acquisition configuration values may determine how a sense/control device 102-0/1 determines a state of a sense/control device 102-0/1 (e.g., conditions utilized to acquire an image).

A configuration tool 104 may take various forms. For example, a configuration tool 104 may be a portable computing device, such as a handheld computing device. Alternatively, a configuration tool 104 may be a computing system, such as a laptop or other portable personal computer. A configuration tool 104 may also be capable of communicating with a receiver (e.g., 106-0/1) and assigning configuration values to a receiver. In one embodiment, such configuration values may configure a receiver to communicate with one or more particular sense/control devices 102-0/1 WGRs (or communication channels assigned to particular sense/control devices).

While a configuration tool may communicate with a sense/control device 102-0/1 and/or receiver 104 over a wired connection according to various protocols, and, in one embodiment, a configuration tool 104 may communicate with a sense/control device 102-0/1 and/or receiver 104 in a wireless fashion. Such a feature may enable sense/control devices (102-0/1) to be rapidly and easily configured.

A receiver (e.g., 106-0/1) may receive transmitted data from one or more sense/control device 102-0/1, either directly or by way of a repeater 108. A receiver may be a digital receiver 106-0 or an analog receiver 106-1. A digital receiver 106-0 may receive data from a sense/control device and provide such data to a monitoring and/or control system. In very particular arrangements, a digital receiver 106-0 may be a server type computer system that provides such data in particular formats or protocols. As but a few examples, such a server may be a web server that provides access according to any of various Internet protocols. Alternatively, such a server may be a "bridge" server that converts data to some other protocol, or operates according to a predetermined industry standard, such as an (OPC) type server, BACnet compatible system, or GEM standard (promulgated by SEMI) including SECs and/or HSMS-SS.

An analog receiver 106-1 may convert transmitted data from a sense/control device 102-0/1 into analog values for compatibility with legacy control systems at a site. Such analog values may match an analog output of a monitored piece of equipment or may be a value proportional to a reading from the sense/control device 102-0/1.

A repeater 108 may receive transmitted data from a sense/control device 102-0/1, and retransmit such data to a receiver (e.g., 106-0/1) either directly, or by way of another repeater. A repeater 108 may also be configured with a configuration tool 106. A repeater 108 may communicate with two or more transmitter-receiver (hereinafter "transceivers", but not meant to imply any required common circuits between the receiver and transmitter) via two or more connections. In one embodiment, a repeater 108 may receive and transmit wirelessly, and thus include two or more separate radios that may receive and transmit via two or more separate antennas.

In this way, a system 100 may attach sense/control devices 102-0/1 to various pieces of equipment on a site, and communicate with such devices by way of a receiver 106-0/1. In addition, a configuration tool 104 may configure sense/control devices 102-0/1 to read values of its respective piece of equipment, and may configure the various system components to communicate with one another.

From the above, it is understood that a system may contain two or more main components (i.e., a sense/control device and a receiver) and several optional additional components depending on the required functionality. A receiver may be an analog receiver when a site already has an industrial control panel or has a computer that may accept analog signals. A receiver may be a digital receiver when a site does not have an existing control panel, or separate control or monitoring of gauges is desired. In such an arrangement, a digital receiver may interface with a computer system configured as a control device, or as a special server. A repeater device may be used to further extend the wireless range of the system. Further, an optional configuration tool may be used by an installer to quickly adjust operational parameters for the system during initial installation and/or periodic maintenance.

Figure 2A:
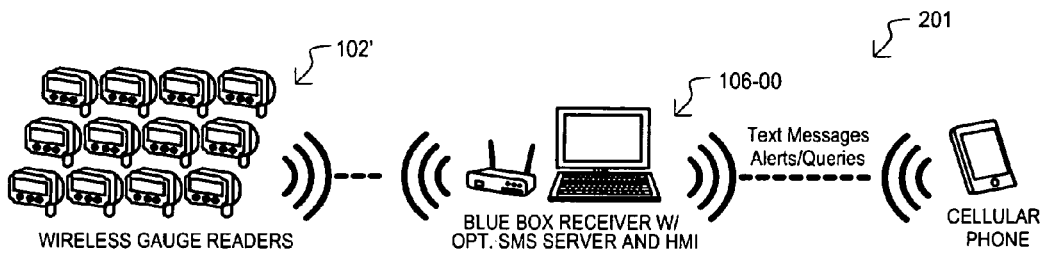
FIGS. 2A to 2C are block diagrams of systems according to various embodiments.
Figure 2B:
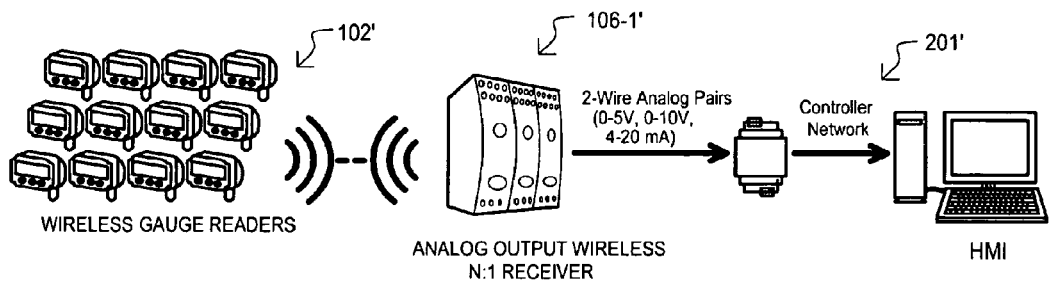
Figure 2C:
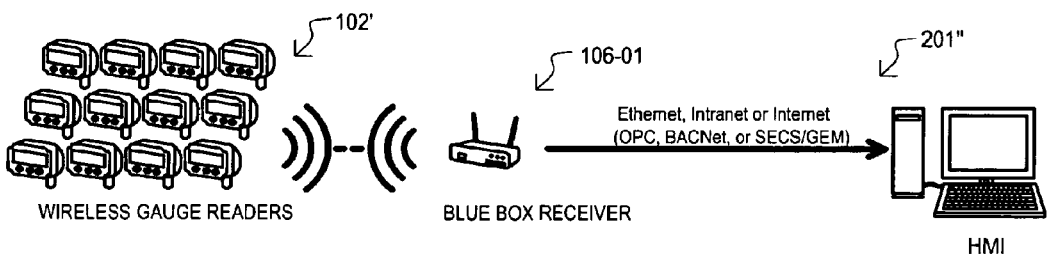

Referring to FIGS. 2A to 2C, three very particular implementations of systems according to embodiments are shown. In the various examples shown, sense control devices 102' are shown to be WGRs, but it is understood that alternate approaches may use different types of sense/control devices. Such sense/control devices 102' may be attached to existing site equipment, avoiding invasive replacement of such existing equipment.

Referring to FIG. 2A, a system 201 may include sense/control devices 102' that may communicate with a digital receiver 106-00 that includes a server that may transmit readings via a network mail services, in this case an SMS server with a human machine interface (HMI). In such arrangement, status of devices 102' may be pushed to a remote device 203 (in this case a cellular phone) connected to the messaging network.

Referring to FIG. 2B, unlike FIG. 2A, a receiver may be an analog receiver 106-1'. Such an analog receiver 106-1' may convert data received from devices 102' into analog signals transmitted on two-wire pairs. Such signals may be received at a control station 205, which may communicate with control device 207 (e.g., personal computer) having an HMI. It is noted that components 205 and 207 may be existing components at a site that might otherwise require cost upgrading or replacement to accommodate wireless monitoring and/or control.

Referring to FIG. 2C, unlike FIG. 2A, a digital receiver 106-01 may transmit data according over a network (local area network, intranet or the Internet) according to any of a number of protocols. Such communications may be received by a control device 207' (e.g., personal computer) having an HMI.

WGR Examples

Having described various system arrangements, particular examples of sense/control devices will now be described.

Referring back to FIG. 1, in one particular arrangement, a sense/control device 102-0 (hereinafter WGR) may include a control section 109-0, an image sensor 114-0, a transmitter/receiver (transceiver) 116-0, and a display system 118-0. In the example shown, a control section 109-0 is implemented with a main controller 110-0 and a secondary controller 112-0. Alternate embodiments may include a control section 109-0 implemented with a single processing device.

A main controller 110-0 may control image sensor 114-0 may communicate with secondary controller 112-0 and display controller 114-0. In one very particular arrangement, a main controller 110-0 may include a processor and instructions (e.g., firmware) for generating a gauge reading value. Such instructions may direct image sensor 114-0 to capture an image of a gauge face, direct the processor to process a resulting image to derive gauge indicator positions, and convert such process results into a final gauge reading. A main controller 110-0 may also include storage locations for storing the various configuration values noted above (communication configuration values, reading configuration values, and reading acquisition configuration values). A main controller 110-0 may also send a gauge reading to a display system 118-0 as well as to a secondary controller 112-0.

In the example shown, a secondary controller 112-0 may control communication functions of a WGR 102-0 by controlling transceiver 116-0. Communication functions may include receiving and transmitting according to a predetermined protocol. In one embodiment, the transmission is wireless. In one particular arrangement, a protocol may be a wirelessUSB protocol, and secondary controller 112-0 may be a radio driver. Secondary controller 112-0 may also "bind" the WGR to a receiver. That is, it may transmit and receive instructions according to a protocol that ensures communication with only the intended receiver(s). In the same general fashion, a secondary controller 112-0 may bind a WGR 102-0 to a configuration tool. Data provided by secondary controller 112-0 via transceiver 116-0 may include but is not limited to, a gauge reading, gauge image, current configuration data, and device identification values. Data values received by secondary controller 112-0 via transceiver 116-0 may include configuration values provided by a configuration tool.

In one particular arrangement, a secondary controller 112-0 may also monitor the status of the corresponding WGR 102-0. Such monitoring may include reading a temperature monitoring elements, such a thermistor for example, and converting such a value into a particular reading format. Such status monitoring may further include monitoring a battery voltage. Still further, a secondary controller 112-0 may place itself and transceiver 116-0 into a lower power drawing state (a "sleep") state. Optionally, a WGR 102-0 may include capacitance sense inputs. In such a configuration, a secondary controller 112-0 may monitor capacitance sense buttons and activate input values in response to contact with such inputs.

An image sensor 114-0 may acquire an image of a gauge face. The manner by which such an acquisition takes place may be controlled according to 5 values commands provided by main controller 110-0.

A transceiver 116-0 may transmit and receive data according to a predetermined protocol.

A display system 118-0 may include a display and a display controller. A display controller may control a display to show particular values. In addition, a display controller may monitor one or more inputs. In response to such inputs being activated, a display controller may send predetermined commands to a main controller 110-0. Such predetermined commands may include a "wake up" (have other components of WGR transition from a sleep mode to an active mode), initiate acquisition mode (have the WGR start a binding process to a configuration tool and/or receiver), display a most recently acquired reading, acquire and display a current reading, display status values for the WGR 102-0.

Having described the functional components of a WGR, particular examples of physical embodiments of a WGR will now be described.

Figure 3A:
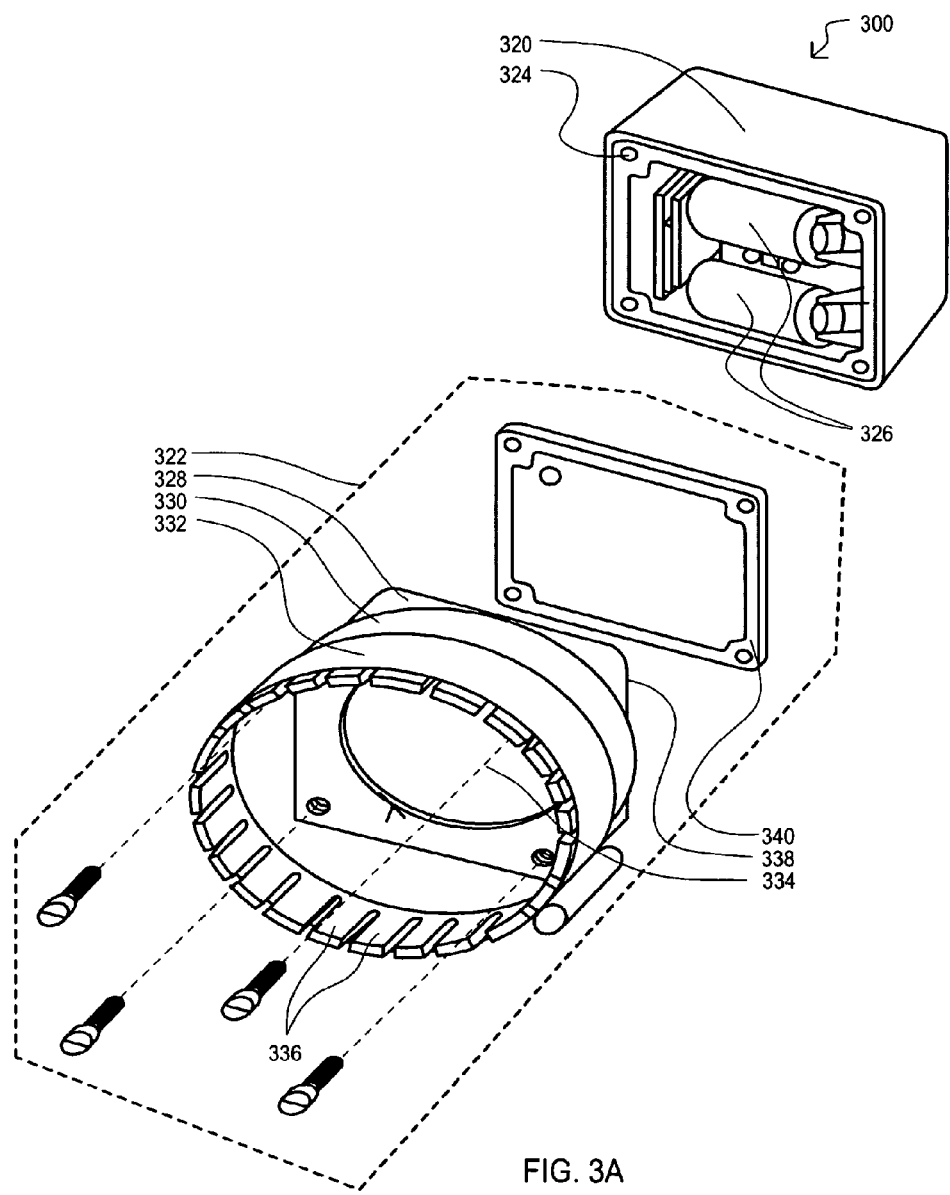
FIG. 3A is an exploded perspective view of a wireless gauge reader (WGR) type sense/control device according to an embodiment.

Referring to FIG. 3A, one example of a WGR is shown in an exploded view, and designated by the general reference character 300. A WGR 300 may include an electronics module 320 and a mounting adapter 322. An electronics module 320 may contain the various electronics components for a WGR 300, including those shown in FIG. 1. An electronics module 320 may be separate from a mounting adapter, and adaptable to connect to various different mounting adapters. Thus, the more valuable electronics may be separate from a less costly mechanical attachment portion. In one embodiment, an electronics module 320 may be assembled into a waterproof structure. In the example shown, an electronics module 320 may include a gasket interface 324 for accommodating a gasketed seal with mounting adapter 322. As will be shown in other views below, an electronics module 320 may further include a display, as well as control inputs. In the particular view of FIG. 3A, an electronics module 320 is shown to contain batteries 326.

A mounting adapter 322 may physically attach an electronics module to a piece of equipment, which in this very particular example may be a circular piece of equipment, such as a gauge. In FIG. 3A, a mounting adapter 322 may include a fitting portion 328, a holding band 330, and a clamp 332. A fitting portion 328 may be shaped to fit with an intended piece of equipment, and may include an imaging opening 334, flexible fingers 336, and an adapter gasket interface 338. An image opening 334 may allow an electronics module 320 to acquire an image of the piece of equipment to which the WGR 300 is attached. Flexible fingers 336 may allow a WGR 300 to accommodate various physical features of the targeted equipment (i.e., valve piping, rivets, or other variations in shape and size, etc.).

An adapter gasket interface 338 may correspond to gasket interface 324 of the electronics module 320. A holding band 330 may be a resilient structure that allows a fitting portion 328 to better match a gauge shape and/or improve the friction of the mounting. A holding band 330 may also provide a better gripping surface for clamp 332, and prevent unwanted materials (e.g., dust, water) from entering an interior of a WGR that could obscure an acquired image. A clamp 332 may be a worm gear type ring clamp.

As understood from FIG. 3A, an electronics module 320 may be attached to fitting portion by a windowed gasket 340. A windowed gasket 340 may allow an image to be acquired via image opening 334, while at the same time maintaining a waterproof seal. In the very particular example of FIG. 3A, attachment may be made by way of bolts and threaded openings in the electronics module 320 and/or fitting portion 328.

Figure 3B:
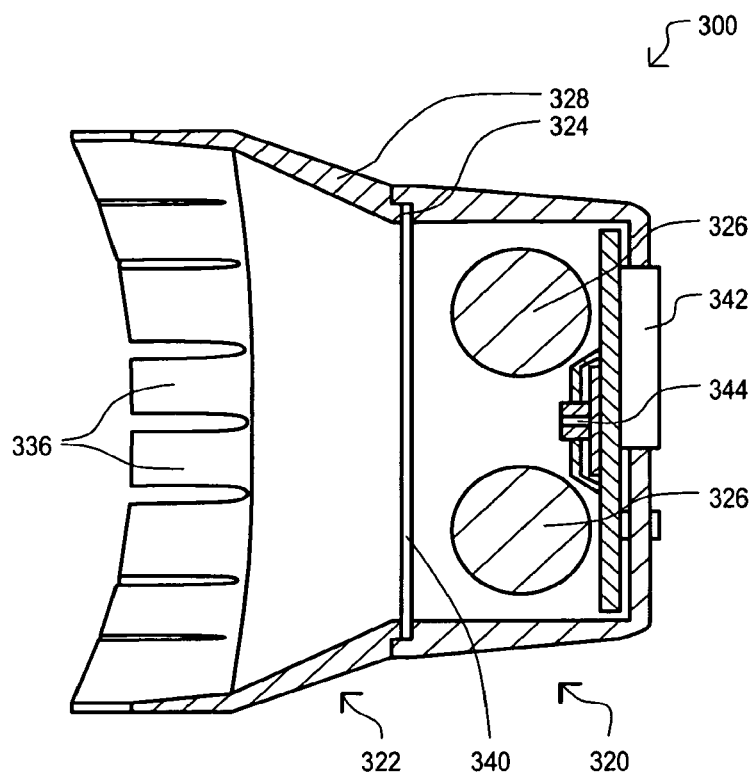
FIG. 3B is a side cross sectional view of a WGR according to an embodiment.

Referring now to FIG. 3B, a WGR 300 is shown in a side cross sectional view, in assembled form, but without a holding band or clamp. In addition to other features noted above, FIG. 3B shows a display 342 as well as an aperture 344 through which an imaging device may acquire an image.

Figure 3C:
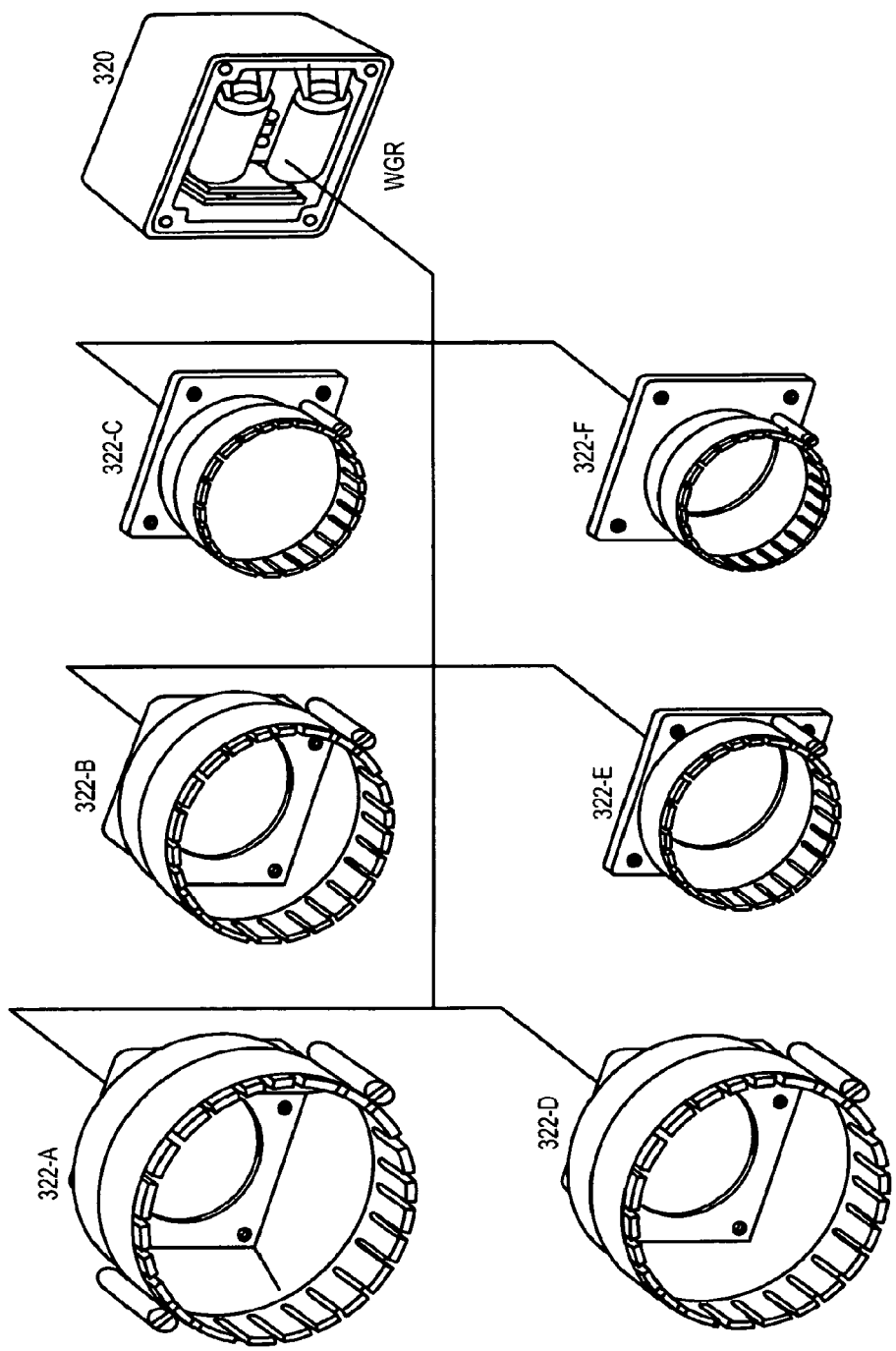
FIG. 3C is a perspective showing how one electronics module may be attached to mounting adapters of various sizes.

Referring to FIG. 3C, various mounting adapters 322-A to 322-F are shown accommodating different sized pieces of equipment. It is noted that mounting adapters (322-A to 322-F) are all compatible with a same electronics module 320. Such modularization may allow one sized electronics module to be adaptable to various different sized pieces of equipment.

Figure 3D:
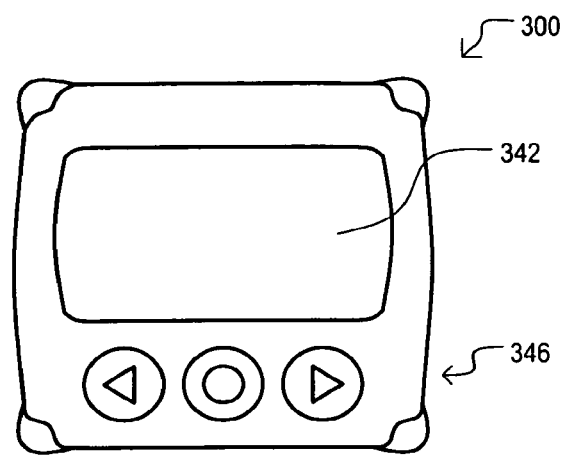
FIG. 3D shows a plan view of a display and inputs of a WGR according to an embodiment.

Referring now to FIG. 3D, a display side of an electronics module 300 is shown in a plan view. It is understood that this view is opposite to the side containing the gasket interface. In the example shown, electronics module 300 may include display 342 and module control inputs 346. A display 342 may present information about the piece of equipment to which the WGR 300 is attached. A more detailed explanation of the display shown will be described below. Module control inputs 346 may allow various functions of a WGR 300 to be accessed in a manual fashion. In the example shown, control inputs 346 include a right, center and left button. A more detailed explanation of such control inputs will also be described below.

A WGR display may provide data about a monitored piece of equipment for visual display. It is understood that a display may be on during normal operation or off during normal operations, as the WGR transmits reading/control data. A display may provide an indication of a current reading, indicate status information for the WGR, as well as indicate particular modes of operation of a WGR. A reading indication may be a graphical representation, may be an alphanumeric representation, or both.

Figure 3E:
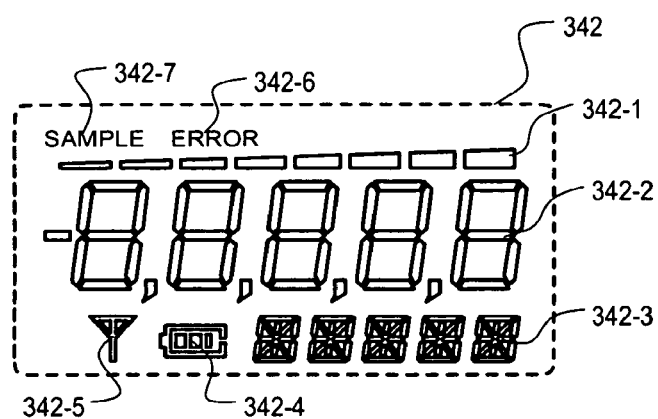
FIG. 3E is a plan view of one example of a display 30 for a WGR according to an embodiment.

Referring to FIG. 3E, one very particular example of a display 342 is shown in a plan view. A display 342 may be a liquid crystal display (LCD) having a graph section 342-1, a first value section 342-2, a second value section 342-3, a battery status icon 342-4, a wireless status icon 342-5, an error icon 342-6, and a sample icon 342-7. A graph section 322-1 may be a bar graph that shows a gauge reading relative to predetermined limits (min value/max value, low/high alarm limit, etc.). A first value section 322-2 may be an alphanumeric display (in this example a 7-segment display) that may show a current gauge reading and/or status information depending upon the WGR mode of operation. A second value section 322-3 may also be an alphanumeric display (in this case a 14-segment display) that may show units of a reading or display other status information according to mode. A battery status icon 342-4 may illustrate a power level for a WGR 300. A wireless status icon 342-5 may indicate when a WGR 300 is in wireless communication with another device, such as configuration tool, repeater or receiver (see FIG. 1, for example). An error icon 342-6 may indicate when an error has occurred in the operation of the WGR 300 or in the inputs to WGR 300. A sample icon 342-7 may indicate when the WGR 300 is processing a reading.

Manual inputs to a WGR may enable a user to manually place a WGR into various modes. Such modes may include setting sampling rates, accessing configuration values for the WGR, entering a configuration mode, entering a secure shipping mode, executing self-test, entering a survey mode, entering a communication configuration mode, or entering a secure mode.

Figure 4:
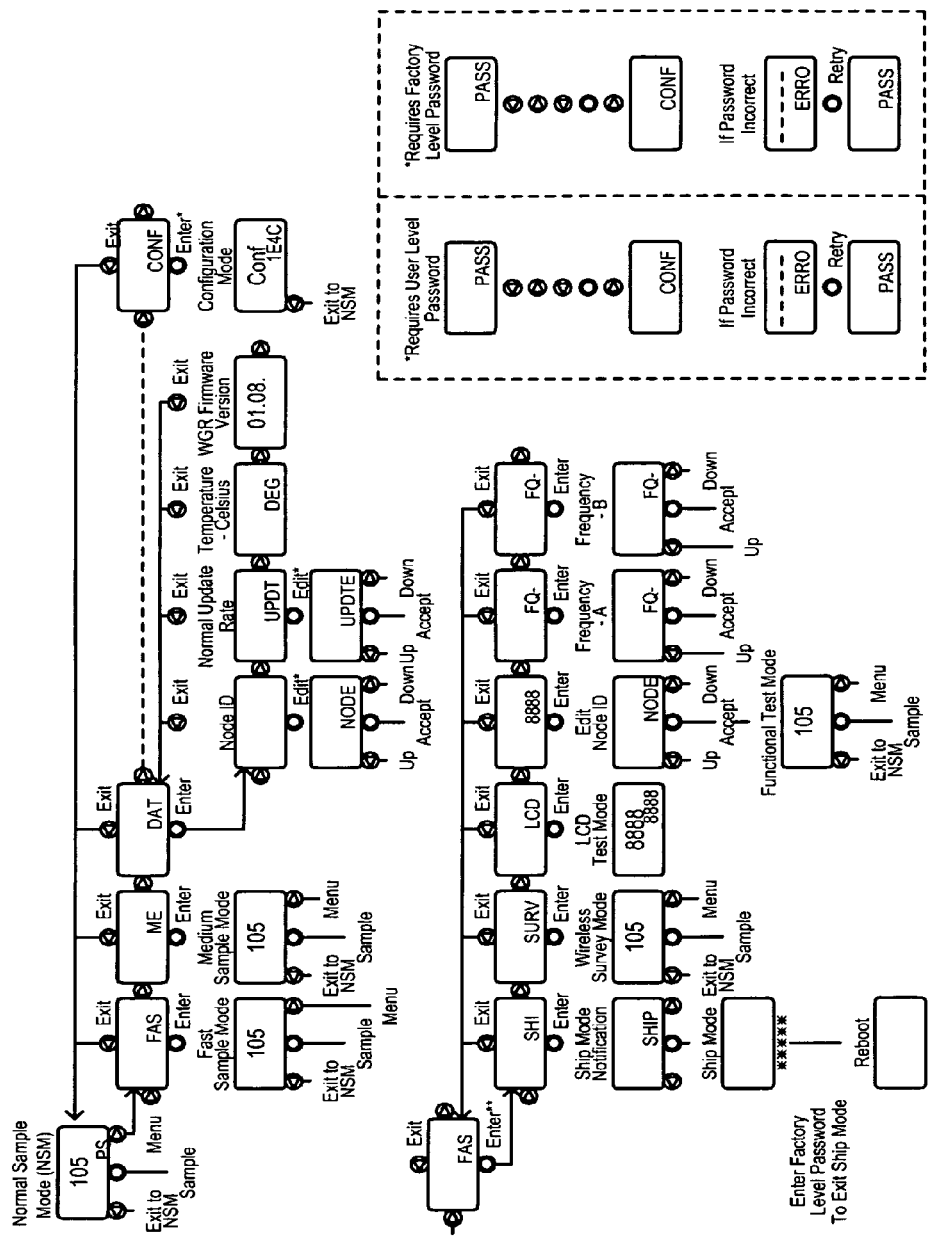
FIG. 4 is a block diagram showing a menu structure that may be included in a WGR according to an embodiment.

Referring to FIG. 4, one example of a manual entry menu structure 400 for inputs like those of FIG. 3D is shown in a block diagram. Menu structure 400 may be implemented via instructions (e.g., firmware) executable by a display controller within a WGR. Menu structure 400 shows particular combinations for entering a fast sampling mode 448-0 or a medium sampling mode 448-1. Such modes may generate readings according to differing speed and/or accuracy parameters. A menu structure 400 may also access current configuration data, which in the example shown may include a node identification (WGRs ID within the site), an update rate for the WGR (which may be the rate at which a WGR sends its reading), a temperature for the WGR, and a firmware version for the WGR.

Menu structure 400 also shows access to a configuration mode 448-2. A configuration mode may allow a WGR to be loaded with configuration values from an external device, such as a configuration tool (e.g. 104).

Additional functions accessible by menu structure 400 include a ship mode 448-0 that may place a WGR 400 into a low power secure state. A WGR 400 may be taken out of the state by entering a manufacturer provided code 448-0. Functional test modes may include a display test 448-5 as well as a functional test 448-6. Communication frequencies (two in this example), may also be set with menu structure 400.

Figure 5:
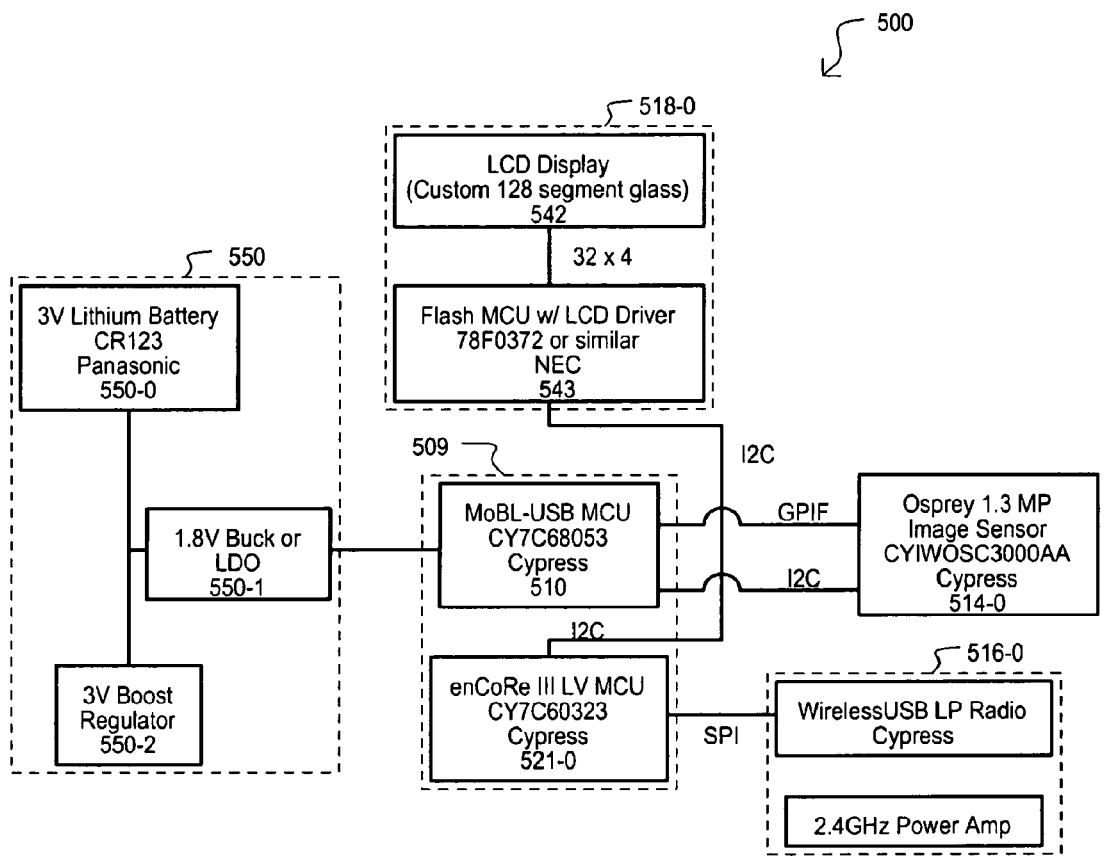
FIG. 5 is block schematic diagram of a WGR according to another embodiment.

Referring now to FIG. 5, a very particular example of a WGR 500 is shown in a block schematic diagram. In one particular arrangement, WGR 500 may represent one particular implementation of WGR shown as 102-0 in FIG. 1.

In the particular example of FIG. 5, a WGR 500 may have control section 509 with a main controller 510-0 formed with a MoBL-USB™ microcontroller CY7C68053 manufactured by Cypress Semiconductor Corporation of San Jose, Calif., U.S.A. A main controller 510-0 may receive power from a power section 550, have a data bus (in this case an I2C bus) connected a display section 518-0, an image sensor 114-0, and a secondary controller 512-0. Main controller 510-0 may also be connected to image sensor 114-0 via a general purpose input/output (GPIF). In one arrangement, a main controller 510-0 may perform a number of functions based on firmware routines, including but not limited to: initializing the image sensor 514-0, receiving configuration values from an external source, capturing an image from image sensor 514-0, transmitting a captured image to a device external to the WGR 500, processing a captured image to determine a reading, sending a reading to display controller 543 and/or secondary controller 512-0, and entering a low power sleep mode. In the very particular example shown, an image sensor 114-0 may be formed with a 3.1 megapixel CMOS sensor CYIWOSC3000AA manufactured by Cypress Semiconductor Corporation.

A secondary controller 112-0 may be formed with an encore II microcontroller CY7C60323, also manufactured by Cypress Semiconductor Corporation. Secondary controller 112-0 may be connected to a transceiver 116-0 by a serial peripheral interface (SPI) type connection. Firmware in the secondary controller 112-0 may control the radio driver and wireless communication protocol. A transceiver 516-0 may include a low power radio (radio driver) as well as a power amplifier.

A display system 518-0 may include an LCD display 542 and a display controller 543 that may be formed with a flash MCU with LCD driver 78F0372 manufactured by NEC Corporation of Japan. In one arrangement, firmware in the display controller 543 may dictate all display functions as well as power management for the entire WGR device 500. In one arrangement, a display controller 543 may have a number of functions, including: entering a shipping state (maintain a low power state that may (a) only be exited from by a predetermined input sequence, (b) ensure all other components of a WGR are placed in a powered down state); sending requests to the main controller to configure the WGR, attempting to bind with an external device (e.g., configuration too, repeater or receiver); and monitoring physical inputs of the WGR.

A power section 550 may include a battery source 550-0, a step down voltage regulator 550-1, and a boost regulator 550-2. A battery 550-0 source may include one or more 3 volt batteries, having an output voltage regulated by boost regulator 550-2. Such a regulated 3 volt supply may be provided to display system 518-0. A step down voltage regulator 550-1 may provide a lower voltage (in this case 1.8 volts) to other sections of a WGR 500.

Of course, FIG. 5 shows one particular implementation of WGR components.

Figures 0, 6A:
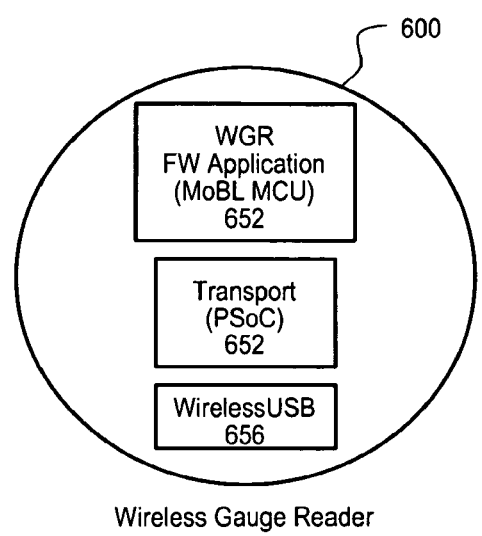
FIG. 6A-0 is a diagram of a WGR showing various functional layers of a WGR according to an embodiment.
Figures 1, 6A:
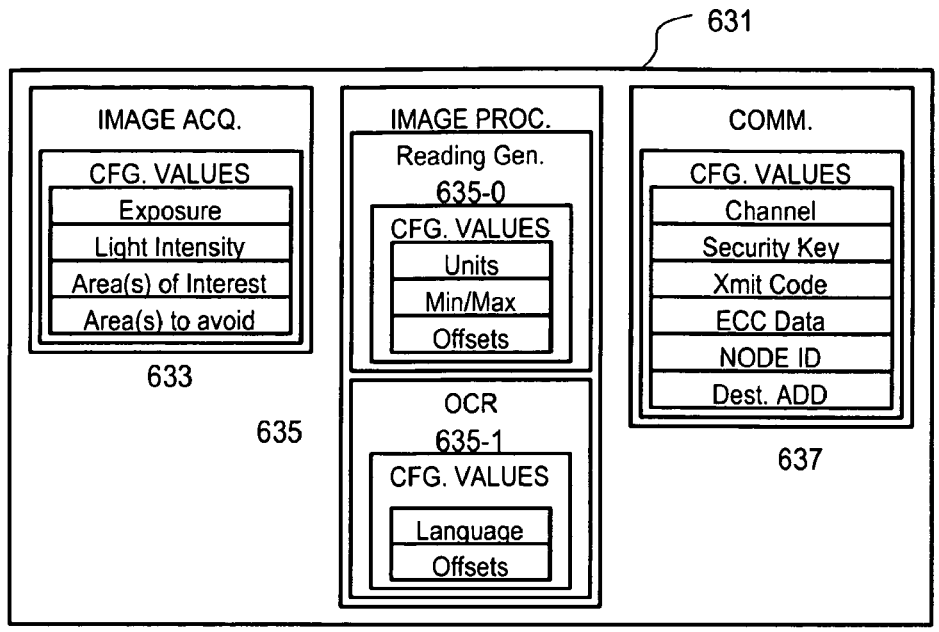

While a WGR may be conceptualized as including various components, a WGR may also be understood with reference to its executable functions. FIG. 6A-0 shows one example of a WGR 600 as a series of functional layers. In the example shown, a WGR 600 may include an application layer 652, a transport layer 654, and a transmission layer 656. An application layer 652 may execute application functions noted above and described herein. A transport layer 654 may control communications from applications to other devices. A transmission layer 656 may control the physical transmission between devices. In one embodiment, such transmission is a wireless transmission according to a USB protocol.

In one particular example, WGR firmware may execute the following functions according to mode:

Normal Data Sampling Mode: This mode may be entered periodically according to a configuration values set within a WGR (i.e., update rate). In addition, this mode may be entered via physical inputs to a WGR (see FIG. 5, for example).

a1) A display controller (e.g., 543, 118-0) wakes up at a selected sampling interval (update rate) using a low power timer.

a2) The display controller enables the main controller bus translators (e.g., I2C).

a3) The display controller switches image sensor (e.g., 114-0, 514-0) out of a lower power (e.g., trickle-current) mode.

a4) The display controller wakes up the main controller (e.g., 110-0, 510-0).

a5) The display controller issues a bus command to request new data sample.

a6) The main controller activates a light source (e.g., light emitting diode (LED)) to illuminate the piece of equipment (e.g., gauge face), and command image sensor to capture the resulting image.

a7) The main controller captures image from the image sensor.

a8) The main controller turns off the LED.

a9) The main controller turns of the LED.

a10) The main controller puts image sensor to sleep mode.

a11) The main controller signals the display controller to power-up secondary controller (e.g., 112-0, 512-0), and transceiver (e.g., 116-0, 516-0).

a12) The display controller enables secondary controller bus translators (e.g., I2C).

a13) The main controller processes the image data and calculates a result.

a14) The main controller transfers the calculated result to secondary controller over bus.

a15) The secondary controller packages the result as message(s) in a predetermined protocol (e.g., wirelessUSB) and transmits the message.

a16) The secondary controller responds to the transceiver with success or failure indication. If requested, a secondary controller may also sample a battery voltage and thermistor (i.e., temperature indicator) and include results in such a transmission).

a17) A secondary controller and transceiver may then be placed into a sleep mode.

a18) A main controller may send the calculated result to display system and may go into a sleep mode.

a19) A display controller may update its display with the result.

a20) A display controller may switch an image sensor into a low power mode.

a21) A display controller may switch off a transceiver and secondary controller, and power down bus translators.

a22) A display controller may go into a sleep mode.

In this way, a sense/control device, such as a WGR, may be easily attached to an existing piece of equipment with a relatively low cost mounting adapter that may accommodate variations in equipment size and shape. At the same time, higher cost components may be contained in an electronics module in a sealed, waterproof fashion, where such an electronics module may be attached to different types of mounting adapters.

Further, a WGR may include low power shipping modes, the capability of transmitting a reading and/or an image to an external device, the capability of receiving configuration information for determining is communication parameters and/or image acquisition parameters.

Referring to FIG. 6A-1, one example of an application layer of a sense/control device that includes image processing is shown in block diagram and designated by the general reference character 631. An application layer 631 may include an image acquisition function 633, image processing functions 635, and a communication function 637.

An image acquisition function 633 may acquire an image based on particular configuration values CFG. VALUES. Such values may include those mentioned previously, including an exposure time, light intensity, areas of interest, and areas of disinterest (areas to avoid).

Image processing functions 635 may include a reading generation function 635-0 which may generate a reading from an image, such as deriving a reading from a needle gauge, bar type gauges, etc. In the particular embodiment shown, an image processing function may optionally include an optical character recognition (OCR) function 635-1. Such a function may determine gauge units, gauge type, or derive a reading from characters on an equipment display (i.e., LED, LCD, mechanical counter, etc.), or characters from gauge face (e.g., units, limits, gauge type, etc.). Various image processing functions may also operate to corresponding configuration values CFG. VALUES.

A communication function 637 may control communications between a sense/control device and other devices of a system, such as receiver and/or repeater. Such functions may identify a sense/control device (and hence the equipment attached to it), and well as control security of transmissions. In the very particular example shown, configuration values (CFG. VALUES) may include "Channel" values which may determine over which channel(s) data are received/sent, a "Security Key" for encrypting and/or decrypting values, a "Xmit Code" which may be a code utilized for sending/receiving data (e.g., a spreading code in the case of Direct Sequence Spread Spectrum modulation), "ECC Data" may be a value for an error detection/correction method (e.g., a checksum seed value), a "NODE ID" to identify a sense/control device within a network, and a "Dest. ADD" may indicate network address for a target server (e.g., IP address, MAC address).

It is noted that all configuration values may be programmed into a device in a configuration operation by a configuration tool, examples of which are described below.

Referring once again to FIG. 1, it is noted that sense/control device 102-1 may include the same general sections as sense control device 102-0, thus like sections are referred by the same reference character, but with a last digit being "1" instead of "0". However, as noted above, such a device does not include an image processor.

Figures 0, 6B:
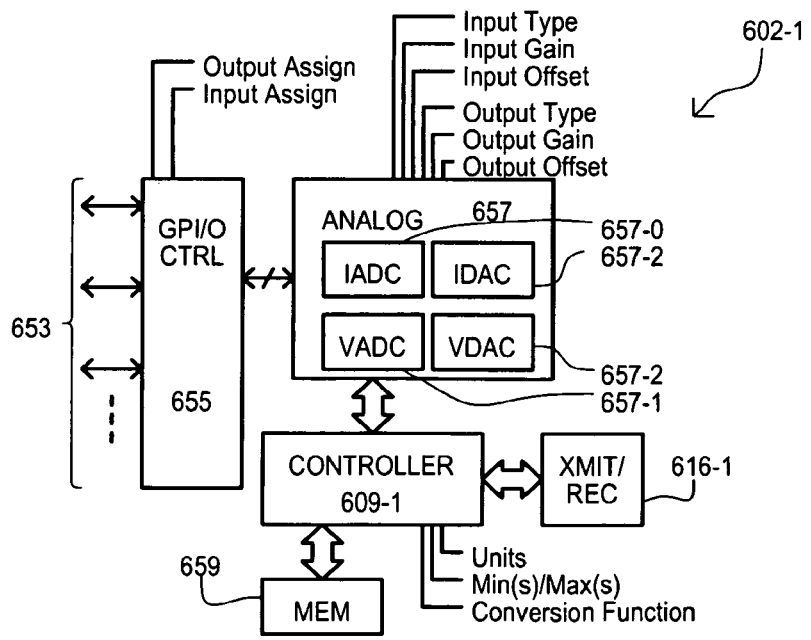
Figures 1, 6B:
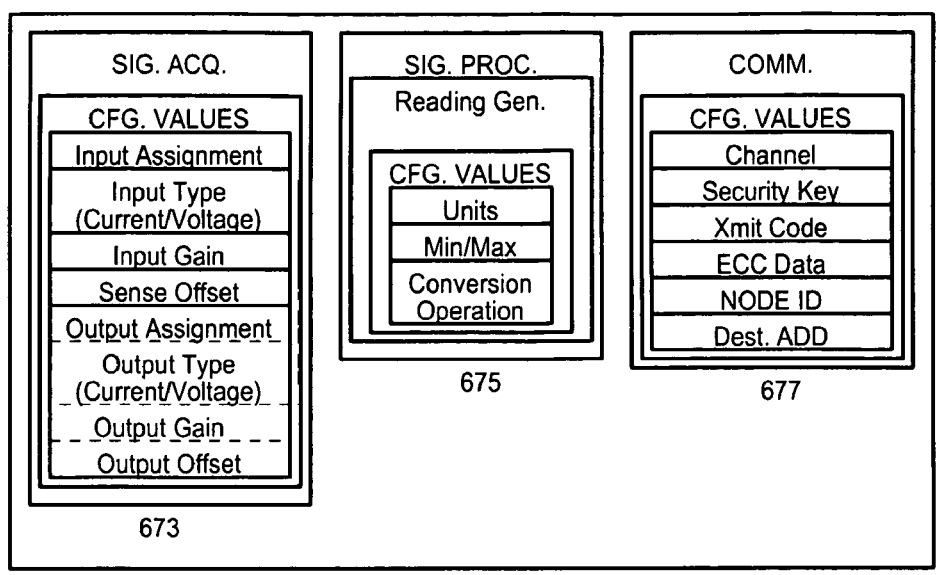

Referring now to FIG. 6B-0, one very particular example of a sense/control device that does not include image sensing is shown in a block schematic diagram, and designated by the reference character 602-1. A sense/control device 602-0/1 may include inputs (and optionally outputs) 653, general purpose input (and/or output) switching control 655, an analog block 657, a controller 609-1, a transceiver 616-1, and a configuration memory 659. In the particular example shown, according to assignment data (Output Assign, Input Assign), a particular input/output (I/O) may be assigned as an input or output with respect to analog block 657.

Analog block 657 may convert an analog input into a digital value utilizing a current analog-to-digital converter (IADC) 657-0 and/or a voltage VADC 657-1. Optionally, in the event sense/control device 602-0/1 provides output signals, an analog block 657 may include a current analog-to-digital converter (IADC) 657-0 and a voltage ADC (VADC) 657-1. If output values are provided by sense/control device 602-1, an analog block may also include a current digital-to-analog converter (IDAC) 657-2 and/or a voltage DAC (VDAC) 657-3. Circuit blocks 657-0 to 657-3 may be dedicated circuits within analog block 657, or analog block 657 may be configurable into such functions, such as a programmable mixed signal type integrated circuit.

Operations of analog block 657 may be controlled according to various configuration values. A value "Input Type" may determine the type of input signal received (e.g., current or voltage), and may for example, connect a given input to either IADC 657-0 or VADC 657-1. A value "Input Gain" may amplify a received input signal by a predetermined gain amount prior to determining a reading. A value "Input Offset" may apply a predetermined offset to a received signal prior to determining a reading. Of course, gain values or offset values may be negative, and gain values may also be less than unity. In the event a sense/control device 602-1 provides analog output signals, corresponding output configuration values may control the operation of analog block 657. A value "Output Type" may determine if an output is driven by an IDAC 657-2 or VDAC 657-3. "Output Gain" and "Output Offset" may modify a signal prior to it being driven on an output.

A controller 609-1 may generate a digital reading value from a received ADC value, and/or provide a digital input to a DAC. A controller 609-1 may operate according to configuration values. A value "Units" may be used to attach a code and/or string to a transmitted value to indicate units of a reading. "Min/max" values may establish where maximum and minimum values for a reading may be. A "Conversion Function" may be used to translate a converted value to generate a reading. For example, there may be a coefficient, or a monitored response may represent a non-linear values (e.g., logarithmic, etc.). It is noted that a conversion function may be an algorithm, look-up table, etc. That is, a conversion function may not be a discrete value. Such a conversion may be implemented by a controller 609-1 executing predetermined instructions on a value received from an ADC, or from transceiver 616-1.

A memory 659 may store the various configuration values noted above.

A transceiver 616-1 may enable a sense/control device 602-1 to communicate with an external device, such as a receiver or a repeater.

In such an arrangement, the various configuration values may be stored to memory by an external calibration device, and hence configure the operation of the sense/control device.

Referring to FIG. 6B-1, one example of an application layer of a sense/control device like that of FIG. 6B-0 is shown in a block diagram and designated by the general reference character 671. An application layer 671 may include a signal acquisition function 673, signal processing functions 675, and a communication function 677. A signal acquisition function 673 may determine how an analog signal is processed. These functions and those configuration values (CFG. VALUES) for controlling such functions, were described above and so will not be described in detail herein. Signal processing function 675 may be similar to that shown as 635-0 in FIG. 6A-1.

These configuration values may also be programmed into a device in a configuration operation by a configuration tool, examples of which are described below.

Configuration Tool Examples

Having described various system WGR examples, particular examples of configuration tools will now be described.

Referring back to FIG. 1, in one particular arrangement, a configuration tool 104 may include a processor 152, memory 154 and tool transceiver 156. A configuration tool 152 may communicate with either of sense/control devices 102-0 or 102-1. A processor 152 may execute instructions stored in memory 154 based on user inputs. A memory 154 may include nonvolatile as well as volatile memory, and may include a configuration application 158. Configuration application 158 may include a series of steps executable by processor 152 for configuring either of sense/control devices 102-0/1 and/or performing a calibration routine on such devices for adjusting how a state if equipment is sensed, or how the equipment is actuated.

As noted above, a configuration tool 104 may be used to configure various types of sense/control devices (e.g., 102-0/1), including but not limited to gauge readers, other transducer readers, temperature readers, and/or actuating devices, such as solenoid actuated valves and audio or visual alarms. Detailed examples of configuration tool functions will be described below. A tool transceiver 156 may transmit and receive data according to a predetermined protocol compatible with at least transceivers 116-0 and/or 116-1 of control/sense devices 102-0 or 102-1. By utilizing a tool transceiver 156, a configuration tool 104 may "bind" with a sense/control device 102-0/1, and thereby establish a communication path with such a device.

Figure 7A:
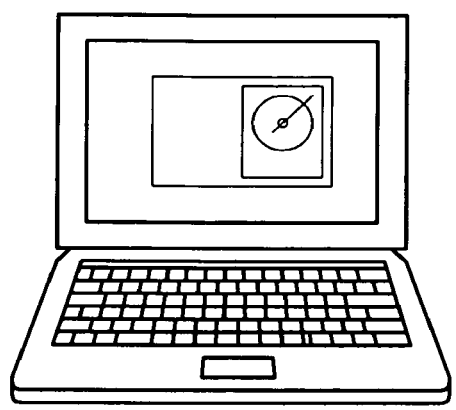
FIGS. 7A and 7B show one example of a configuration tool according to an embodiment.
Figure 7B:
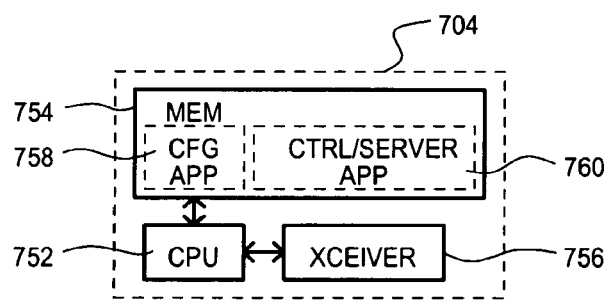

A configuration tool 104 may take various forms (e.g., be implemented on particular platforms), including a specialized computer system. However, in one embodiment, a configuration tool 104 may be a handheld tool, or alternatively a personal computer (PC) system in "desktop" or "laptop" form. One such embodiment of the latter case is shown in FIGS. 7A and 7B. FIG. 7A shows laptop computer running a configuration application. FIG. 7B is a block diagram like that shown as 104 in FIG. 1.

For an approach like that of FIGS. 7A and 7B, a platform may be readily available to customers, dispensing with specialized hardware purchases. In particular implementations like that of FIG. 7B, a control server application 760 may be resident on the same machine. Of course, alternate implementations could not include an application 760. A laptop computer platform may be preferred for its portability, which may enable the configuration tool to be placed in close proximity to a sense/control device for configuration.

In a PC configuration tool, communication between a sense/control device and the configuration tool may be accomplished in various ways. For example, communication may be via a wired connection, in which case transmission may be according to common PC protocols, including but not limited to wired USB, "Firewire", wired IEEE 802x (e.g., Ethernet), or an RS232/485 type serial port. However, in one embodiment a connection may be a wireless connection such as an IEEE 802.x or wirelessUSB. Alternatively, a line of sight link, such an infrared link (e.g., IrDA type link) may be utilized to communicate with a sense/control device.

In this way, a configuration tool may be implemented on a PC platform.

As noted above, a configuration tool may also take the form of a handheld device. Examples of such embodiments will now be described.

Figure 8:
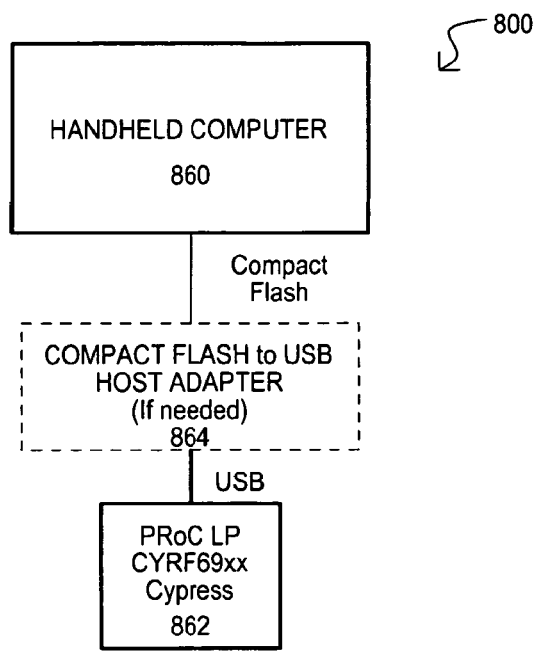
FIG. 8 is a block schematic diagram of a configuration tool according to another embodiment.

Referring to FIG. 8, a handheld (HH) configuration tool 800 may include a host computing system 860 and a transceiver 862. Optionally, depending upon the processor type utilized, an HH configuration tool 800 may include an adapter 864 to enable a host computing system 860 to communicate with transceiver 862. In the very particular example of FIG. 800, a host computing 860 system may have a "flash" storage device type interface, thus a flash-to-USB adapter 864 may be included to provide a communication path to transceiver 862, which in this example may be a USB based PRoC LP (low power programmable radio on a chip) from the device family CYRF69xxx, manufactured by Cypress Semiconductor Corporation.

While the very particular embodiment of FIG. 8 shows wirelessUSB as the communication option, an HH configuration tool 800 may operate with any of the communication types noted above for the PC platform (wired or wireless). However, in one embodiment, a communication type is wireless.

An HH configuration tool 800 may advantageously be lower in cost than a PC platform, be smaller and lighter, and hence provide even greater portability. A handheld platform may also have greater battery life and may be ruggedized for use in both indoor and outdoor settings.

Having described the functional components of a HH configuration tool, examples of physical embodiments of such a configuration tool will now be described.

Figure 9:
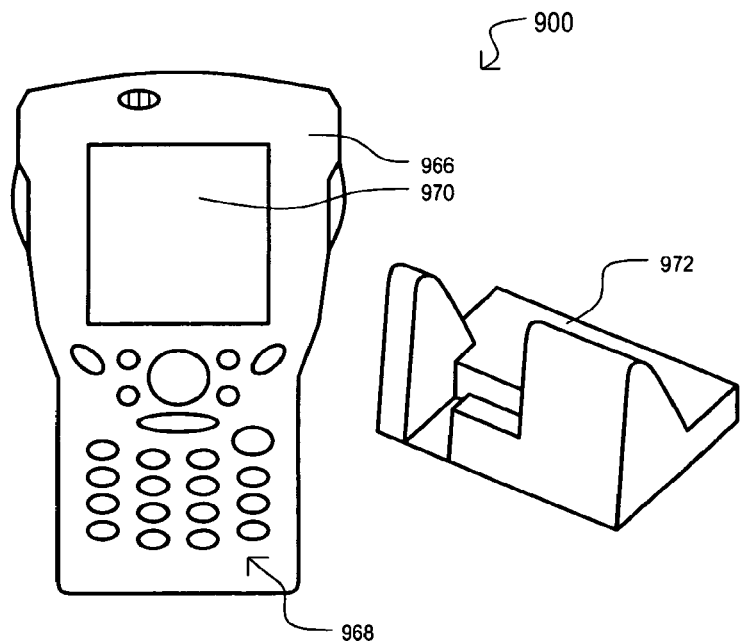
FIG. 9 is a diagram showing one particular example of a handheld configuration tool and corresponding docking station according to an embodiment.

Referring to FIG. 9, one example of a HH configuration tool is shown in a plan view and designated by the general reference character 900. A HH configuration tool 900 may include a housing 966, HH inputs 968, and a touch screen 970. A housing 966 may contain the various electronic components and power supply (e.g., batteries) of the HH configuration tool 900. Inputs 968 may be input buttons including number/letter entry keys, navigation arrows. A touch screen 970 may be configured to display an image acquired by a binded sense/control device. Such a feature may allow for easy configuration/calibration of a sensing function of the binded sense/control device.

In the particular arrangement of FIG. 9, a HH configuration tool 900 may operate in conjunction with a docking station 972. A docking station 972 may provide a communication path from a HH configuration tool 900 and a control server, or some other external system to enable the high speed (relative to a wireless transmission) transfer of data to/from a HH configuration tool 900. In addition or alternatively, a docking station 972 may provide power to recharge batteries within the HH configuration tool 900, and optionally charge a spare battery.

Of course, FIG. 9 shows but one particular implementation of HH configuration tool.

Figure 10:
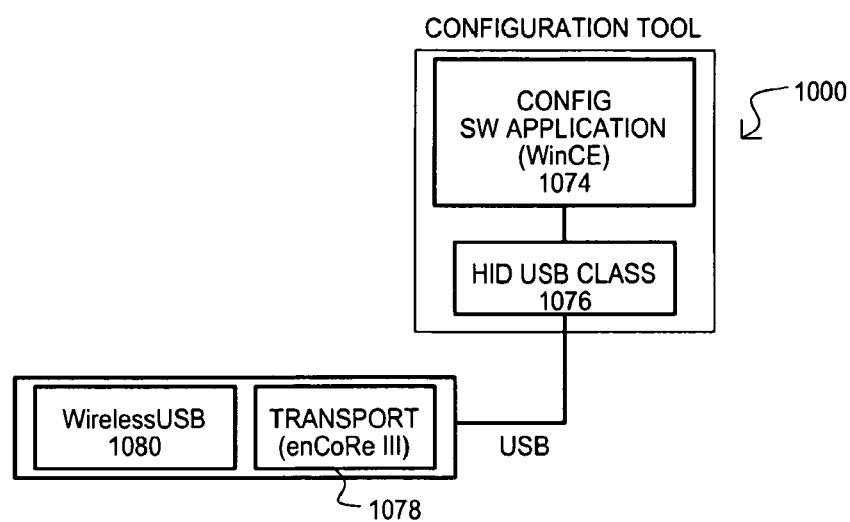
FIG. 10 is a block schematic configuration tool according to another embodiment.

While a configuration tool may be conceptualized as including various components, a configuration tool may also be understood with reference to its executable functions. FIG. 10 shows one example of a configuration tool 1000 as a series of functional layers. In the example shown, a configuration tool 1000 may include a configuration application layer 1074, an interface application layer 1076, a tool transport layer 1078, and a tool transmission layer 1080. An application layer 1074 may execute application functions noted above and described in more detail herein. A tool transport layer 1076 may control communications from applications to other devices. A tool transmission layer 1080 may control the physical transmission between devices. In one embodiment, such transmission is a wireless transmission according to a wirelessUSB protocol.

In one particular example, a configuration tool application may execute any of a number of functions. Examples of such functions will now be described. It is understood that these functions are executable by a processor (e.g., 152, 752) executing predetermined instructions stored in memory (e.g., 154, 754) (in one embodiment stored as firmware).

Figure 11:
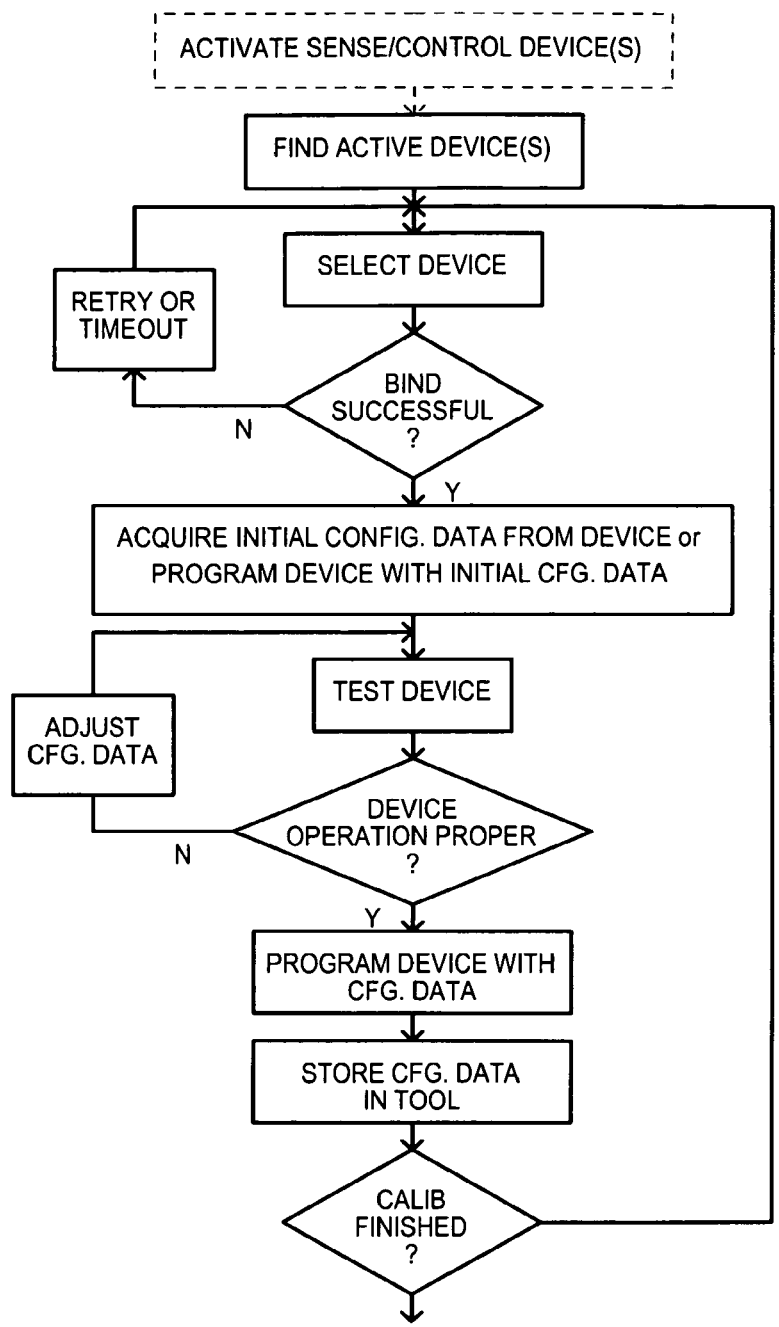
FIG. 11 is a diagram showing one example of a configuration function of a configuration tool according to an embodiment.

Referring to FIG. 11, a configuration function is shown in a flow diagram and designated by the general reference character 1100. A configuration function 1100 is assumed to start after a sense/control device has been activated (1102). Activation of a sense/control device (1102) may include entering a predetermined input sequence that places such a device into an acquisition mode in which it transmits data which identifies the sense/control device. Thus, action 1102 is understood to be executed prior to a configuration function 1100. In one very particular arrangement, a sense/control device 1102 may be placed in an acquisition mode by pressing a predetermined button sequence. In the acquisition mode, the sense/control device 1102 may transmit a communication identifier (e.g., a device number), and optionally a device name, which may be string or other data value changeable by a user to provide easy identification of the device by a user. A device number is, in one embodiment, not changeable, or easily changeable.

A configuration function 1100 may include finding active sense/control devices 1104. Such a step may include activating a receiver circuit (e.g., tx/rx) on a configuration tool to receive the acquisition transmissions of all available activated sense/control devices. In one very particular example, all available sense/control devices may be assembled on a list for visual display on a graphical user interface.

Any device(s) found by a configuration tool may be selected by a user 1106. In one very particular arrangement, such a step may include selection of a sense/control device from a configuration tool touch screen with a finger or stylus. Alternatively, selection may be made with other suitable input devices (buttons, mouse).

Upon selection of a particular sense/control device, a configuration tool may attempt to bind with the device (1108). Binding may include a configuration tool building a communication link with the sense/control device according to a predetermined protocol. As but one example, such a protocol may be a wirelessUSB protocol with a configuration tool acting as a host device. If a binding operation is not successful (N from 1108) a configuration tool may timeout or retry (1110).

If a configuration tool successfully binds with a sense/control device (Y from 1108), the configuration tool may acquire configuration data from the sense/control device, or alternatively, program the sense/control device with an initial set of configuration data (1112). For example, in some arrangements a sense/control device may have already been initially configured, or it may have been shipped with initial configuration data. In such cases, a user may have the option to use such values in the configuration process. In contrast, if sense/control device does not have initial configuration values, or it is known that the present configuration values are unsuitable, initial configuration values may be programmed into the sense/control device.

It is noted that configuration values may take a variety forms according to the type of sense/control device. Thus, such configuration values may include a sample rate (rate at which a sense/control device examines the corresponding equipment), calibration offsets (offset values introduced in determining a reading), unit scaling for provided readings, as well as maximum and minimum limits for a reading. Configuration values may also determine electrical operation of the sense/control device, such as bias levels for currents or voltages, or amplification values. It is noted such configuration values may be used to alter the internal operation of a sense/control device, as well as control the operation of the equipment to which the device is attached.

In the event a sense/control device includes image capture capabilities, configuration values may include exposure time, light intensity, and image processing parameters. For sense/control devices that image process needle type gauges, configuration values may include a minimum maximum angle for a needle, a needle gauge direction (i.e., clockwise/counter-clockwise), or a gauge tilt angle (gauge bottom versus sense/control device image bottom), to name but a few examples. More examples will be described in greater detail below.

Once a sense/control device has an initial set of configuration values, the device may be tested (1114). Such a test may include having the sense/control device generate a reading, or induce an equipment action (e.g., solenoid activation, alarm trigger). If a test result is not adequate (N from 1116), configuration values may be adjusted (1118) and the device response re-tested. However, if a test result is adequate (Y from 1116), the sense/control device may be programmed with the configuration data (1120).

It is also noted that in particular arrangements, a test 1114 may determine a signal strength of a connection (or potential connection) between a sense/control device and a device other than the tool. As but one very particular example, a tool may be deployed in physical proximity to the sense/control device, and from such a position determine the signal strength of receivers and/or repeaters deployed at the same site. Alternatively, a configuration tool may read a signal level strength from the sense/control device itself. Such a function may detect a most reliable transmission destination for the sense/control device (i.e., a route to send data to an end application).

A tool configuration function 1100 may also include storing configuration data (1122). Such a function may include not only storing configuration values as noted above, but may also include storing "raw" data utilized in setting such configuration values. As but one example, configuration data may include raw image data in the event the sense/control device accessed by the tool utilizes image processing to generate a reading.

A tool configuration function 1100 may allow a user to end the function, or return to select another sense/control device (or re-select a previously selected sense/control device) 1124.

In this way, a tool configuration function may select a device from available sense/control devices, configure such a device, and then store the results, including raw data acquired by a sense/control device.

Figure 12:
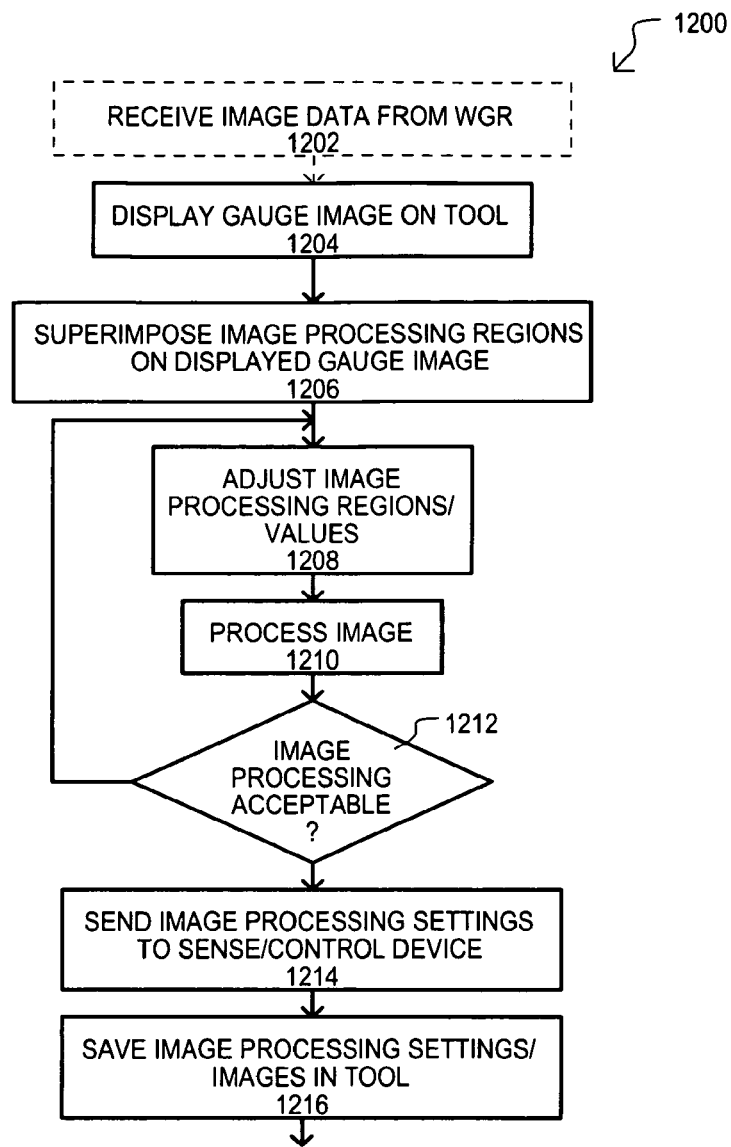
FIG. 12 is a diagram showing one example of an imaging function of a configuration tool according to an embodiment.

Referring to FIG. 12, an image processing configuration function (hereinafter imaging function) is shown in a flow diagram and designated by the general reference character 1200. In the imaging function 1200 shown, it is assumed that image data has been received from a sense/control device (1202), which may be a WGR.

In the particular imaging function 1200 shown, an acquired image may be displayed on the configuration tool (1204).

An imaging function may further include superimposing image processing regions onto a displayed gauge image (1206). Such a feature may allow a user to easily manipulate how an image acquisition/processing takes place. In a preferred embodiment, such ease of adjustment is further enhanced by employing a touch screen by which a user may manipulate how an image is processed by touching a screen with a finger or stylus.

An imaging function 1200 may also include adjusting image processing regions/values (1208). Such functions may include a user adjusting values based on a captured image. In addition, in touch screen embodiments, such an action may be executed by manipulating regions superimposed on an image.

Once an image processing region/values have been downloaded and set within a sense/control device, a configuration tool may process an image (1210). In one embodiment, such a processing may utilize the image processing circuitry of the sense/control device to which the tool is bound. Alternatively, the tool may execute image processing in the same manner as the corresponding sense/control device to which the configuration tool is bound. That is, a configuration tool imaging function 1200 may emulate an image processing operation of a sense/control device on actual data captured by the sense/control device.

If an image processing result is not acceptable (N from 1212), additional adjustment may be made to the image processing regions/values. As but one example, if a final reading value generated by image processing does not match a gauge reading, image processing regions/values may be re-adjusted. However, if an image processing result is acceptable (Y from 1212) such values may be sent to the sense/control device (1214) for storage in the device. In addition, such values, along with an actual acquired image data may be stored within the configuration tool itself (1216).

In this way, a configuration tool may (1) superimpose image processing regions onto an actual image acquired by a sense control device (2) emulate the sense/control device operation to generate configuration values for the sense control device.

Figure 13:
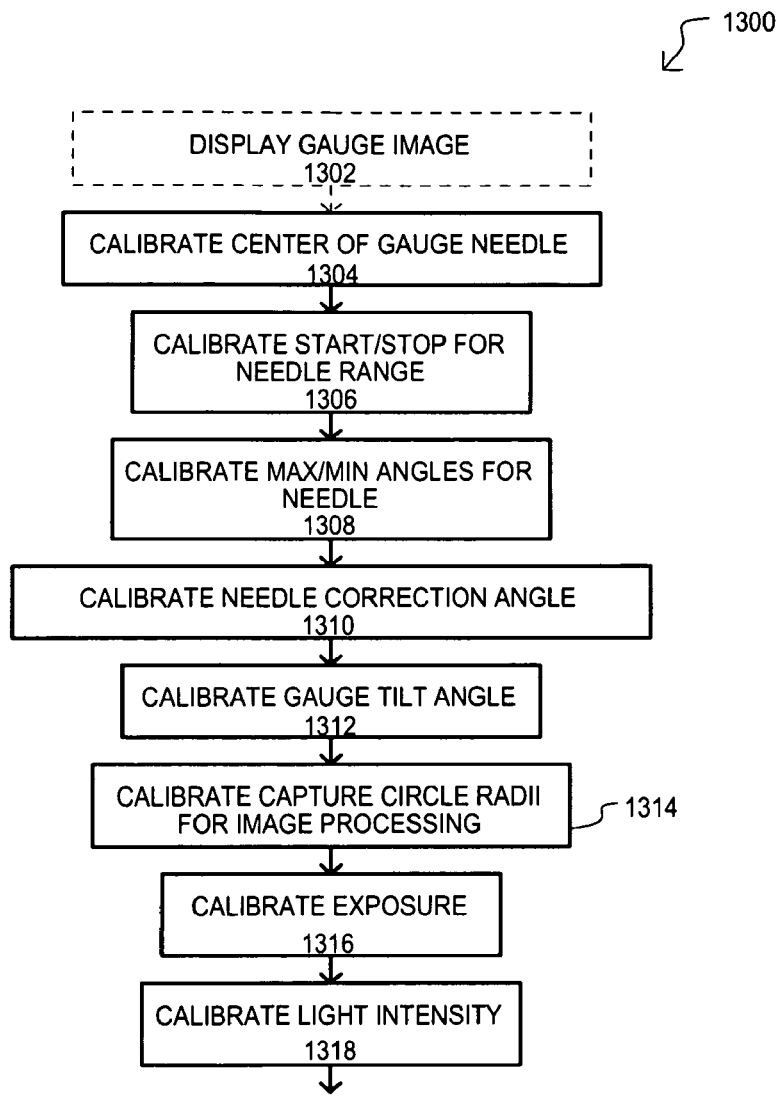
FIG. 13 is a diagram showing one example of a needle gauge configuration function of a configuration tool according to an embodiment.

Referring now to FIG. 13, one very particular example of a configuration tool image adjustment function for a needle type gauge (hereinafter gauge calibration function) will now be described. The particular gauge calibration function 1300 shown in FIG. 13 is assumed to be executed following a needle gauge image being displayed on a configuration tool (1302). In the function shown, a center of a gauge needle may be calibrated (1304). Such a step may include a user identifying a needle center based on the acquired image. This may be accomplished in various ways, including utilizing a touch screen to identify a coordinate(s) corresponding to needle center (pressing on a needle center location on the screen with a finger or stylus), manipulating a cursor position and indicating when such a position corresponds to a needle center. Still further, locations on a captured image may be identified with XY coordinates, and a needle center point may be entered by positioning crosshairs or some other indicator at the appropriate location, and marking the spot according to a user entered value. A few possible ways of entering such XY values may be: (a) entering coordinates into data field boxes, (b) using user interface devices, such as "sliders" to adjust XY values, and/or (c) use key inputs (+/− keys, arrow keys, etc.) to move crosshairs to a desired location.

A gauge calibration function 1300 may also include calibrating a start/stop position of a needle range (1306). Again, such a feature may take advantage of the ability of configuration tool to superimpose regions onto an acquired image. Start and stop positions may be radii extending from an indicated center point, and superimposed onto an acquired image. Such radii values may be entered into a configuration tool in the various ways noted above for a center point. However, rather than display crosshairs, each position may produce a radius.

Figure 14A:
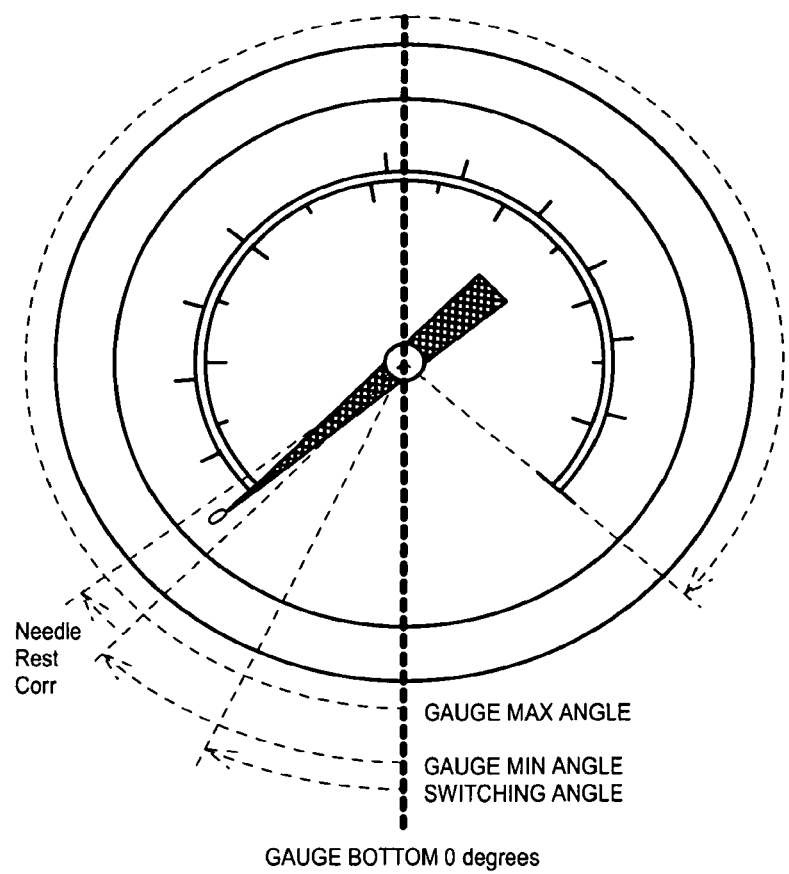
FIGS. 14A to 14C are diagrams showing configuration values described in the embodiment of FIG. 11.

Minimum and maximum scale readings may also be entered (1308). It is noted that such max/min values may differ from start and stop positions of a needle. Min/Max values may be entered in the same fashion as start/stop positions. This function may also include determining a switching angle. A switching angle may be an angle, with respect to a gauge bottom, at which a gauge value will be deemed to have switched from a minimum to a maximum value (or vice versa). Examples of min/max values, as well as a switching angle are shown in FIG. 14A.

Figure 14B:
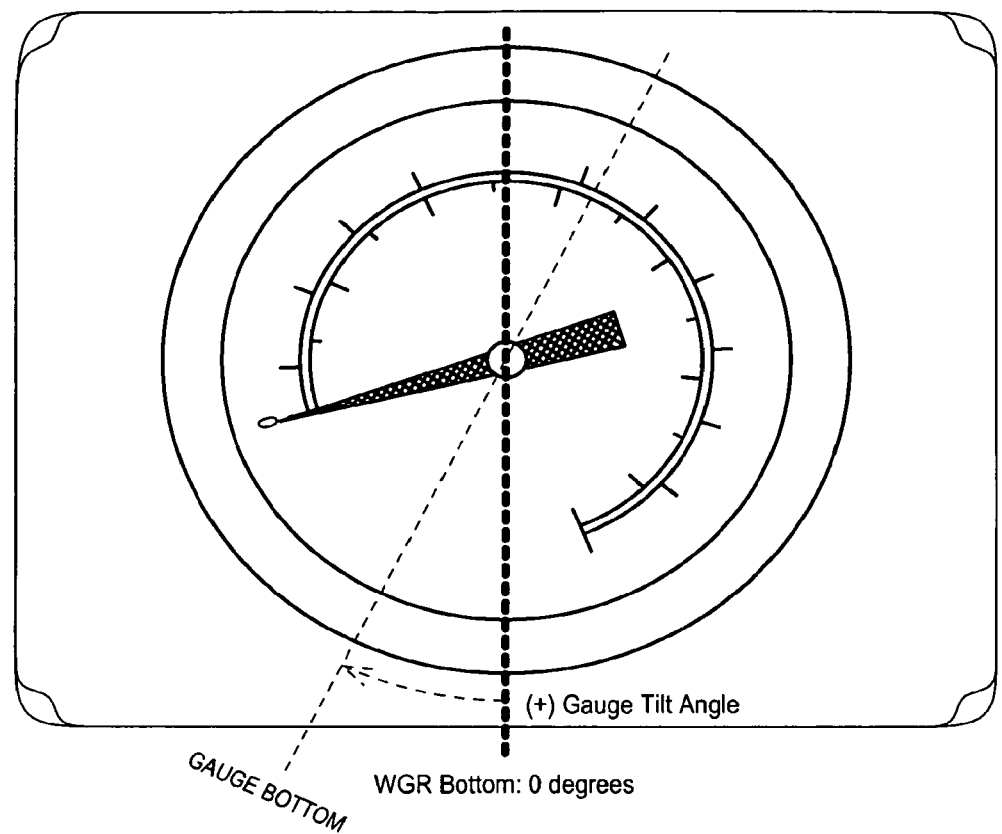
Figure 14C:
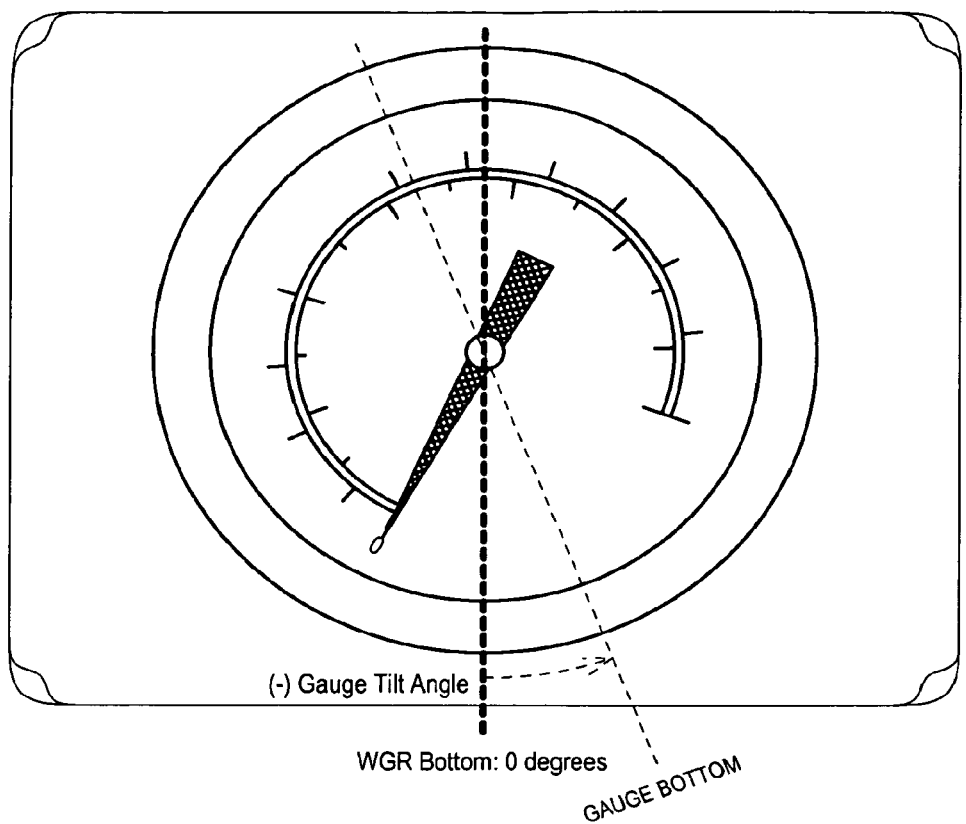

A gauge calibration function 1300 may further include calibrating correction angles (1310). A first type of correction angle that may be determined is a gauge tilt angle. A gauge tilt angle may be a difference between a gauge bottom and a sense/control device bottom. Such a feature may compensate for differences between a gauge bottom and a sense/control device bottom, allowing for greater leeway when attaching a sense/control device to a gauge. Examples of gauge tilt angles are shown in FIGS. 14B and 14C. FIGS. 14C and 14B show a projection of a sense/control device (e.g., WGR) position, with respect to a gauge to demonstrate the difference between a gauge bottom and a sense/control device bottom.

A second type of correction angle may be a needle rest angle. A needle rest angle may be an offset from a minimum value (minimum angle) that still results in a minimum value reading. Such a feature may compensate for gauges in which a needle has some travel at the minimum value and/or the needle rests at a physical stop point prior to reaching a minimum value. One example of a needle rest angle is shown in FIG. 14A.

The gauge calibration function 1300 of FIG. 13 may further include calibrating capture circle radii for image processing 1312. This function may designate circles superimposed upon the image, centered about the needle center (as determined at 1306). Such circles may designate image processed areas that may determine needle position, and hence a gauge reading. Circle sizes may be selected by designating radii in the various ways noted above for a center point. However, rather than display crosshairs, each position may produce a circle centered about the needle center.

Additional functions may be to calibrate image exposure 1316. Such a step may adjust exposure time used to acquire an image in a sense function. Exposure calibration may be a manual process in which exposure values are sent to the sense/control device, and a new image is captured by the sense control device and transmitted to the tool for display. Alternatively, exposure adjustment may be automatic, based on a luminosity histogram, or an average luminosity of the acquired image.

A gauge calibration function 1300 may also include calibrating a lighting intensity of a light source included in a sense/control device 1318. Such an action may be manual or automatic. Again, intensity values may be sent to a sense/control device, and a new image generated and sent to the tool. Such an adjustment capability may help optimize an image for capture by maximizing contrast while minimizing the washing out of critical areas.

In this way, a tool may determine image processing parameters of a sense/control device attached to a needle type gauge, but calibrate such 5 parameters according to an acquired image of the gauge.

A further function of a configuration tool may be the ability to transfer various types of configuration data related to sense/control devices between the configuration tool and some other device, such as a control server, or other external system. One example of a data transfer capability (hereinafter a transfer function) is shown in FIG. 15, and designated by the general reference character 1500.

Figure 15:
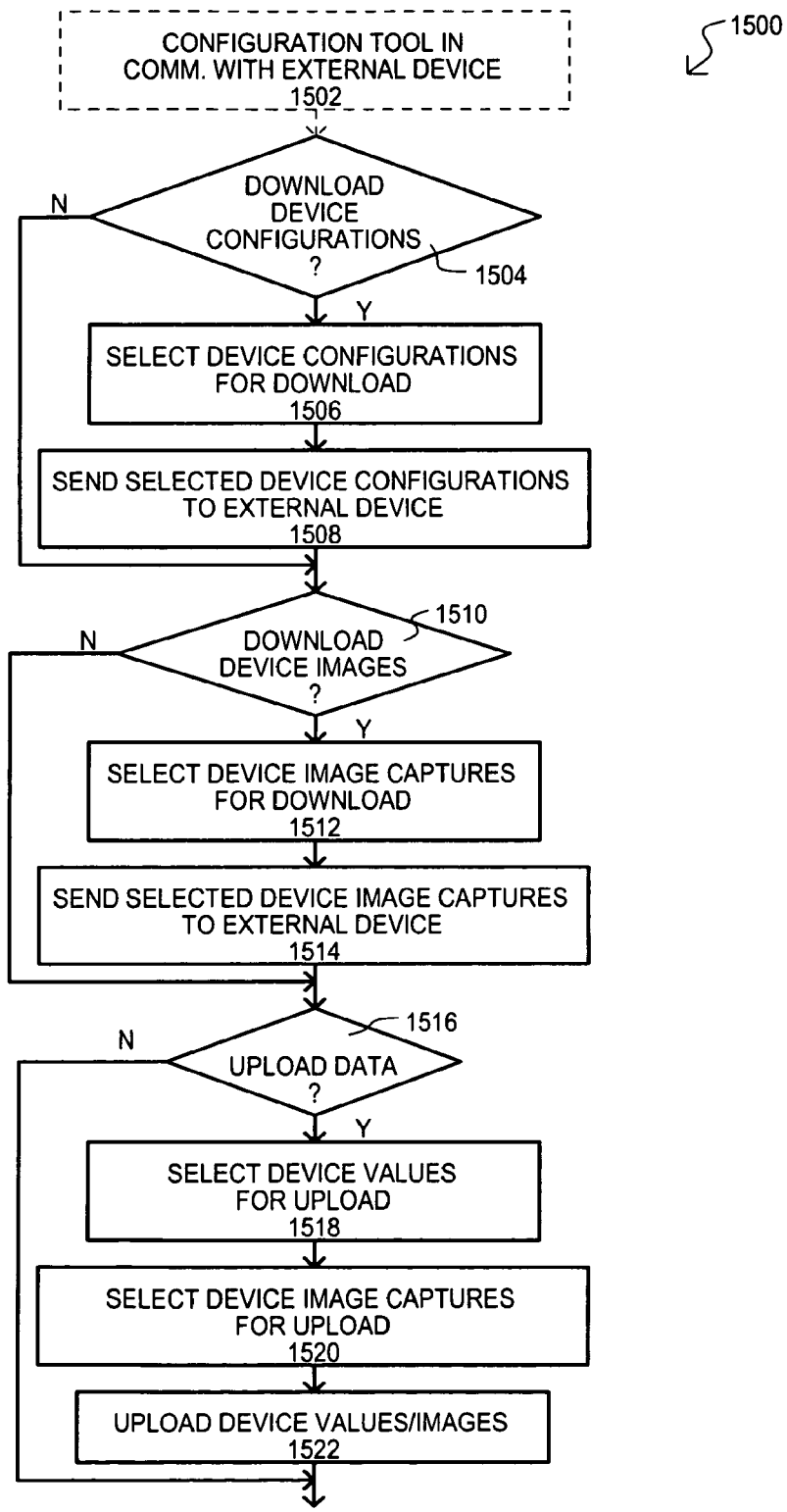
FIG. 15 is a diagram showing a configuration data transfer function of a configuration tool according to an embodiment.
Figure 16A:
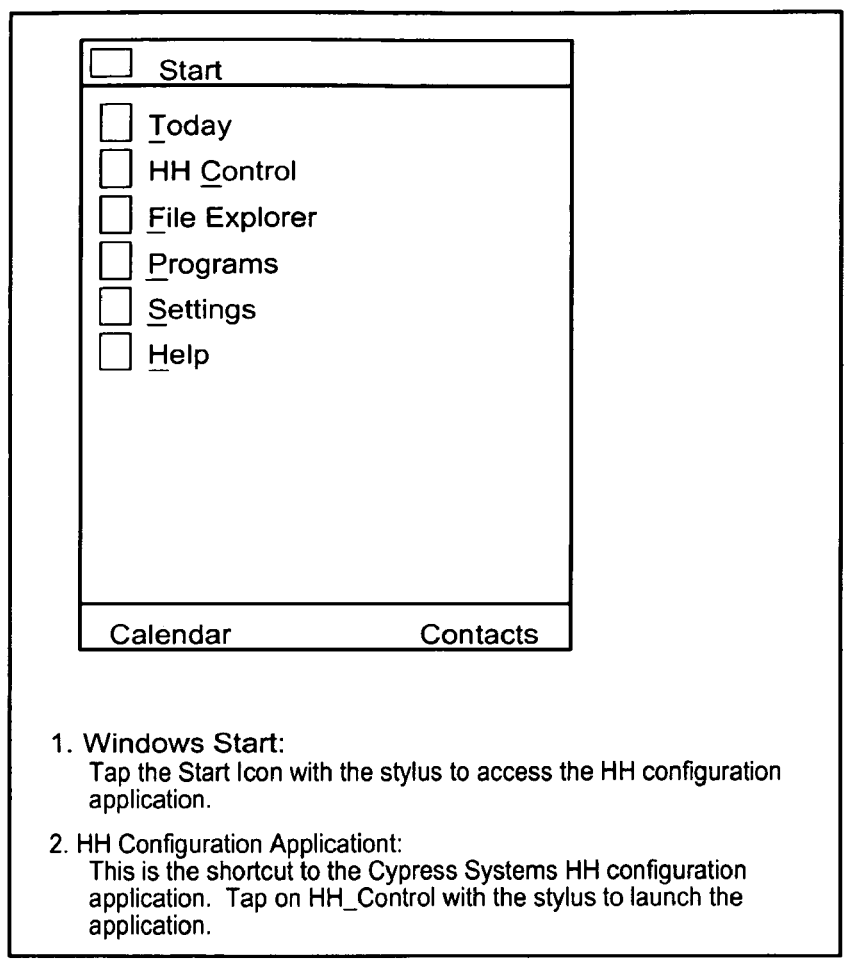
Figure 16C:
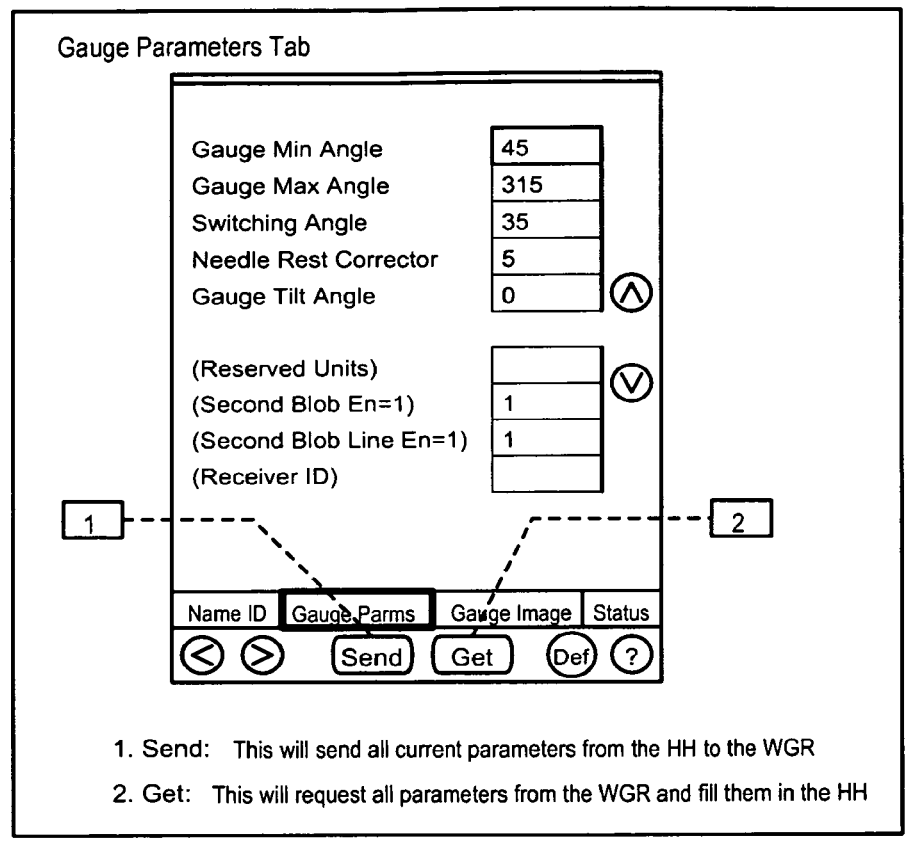
Figure 16G:
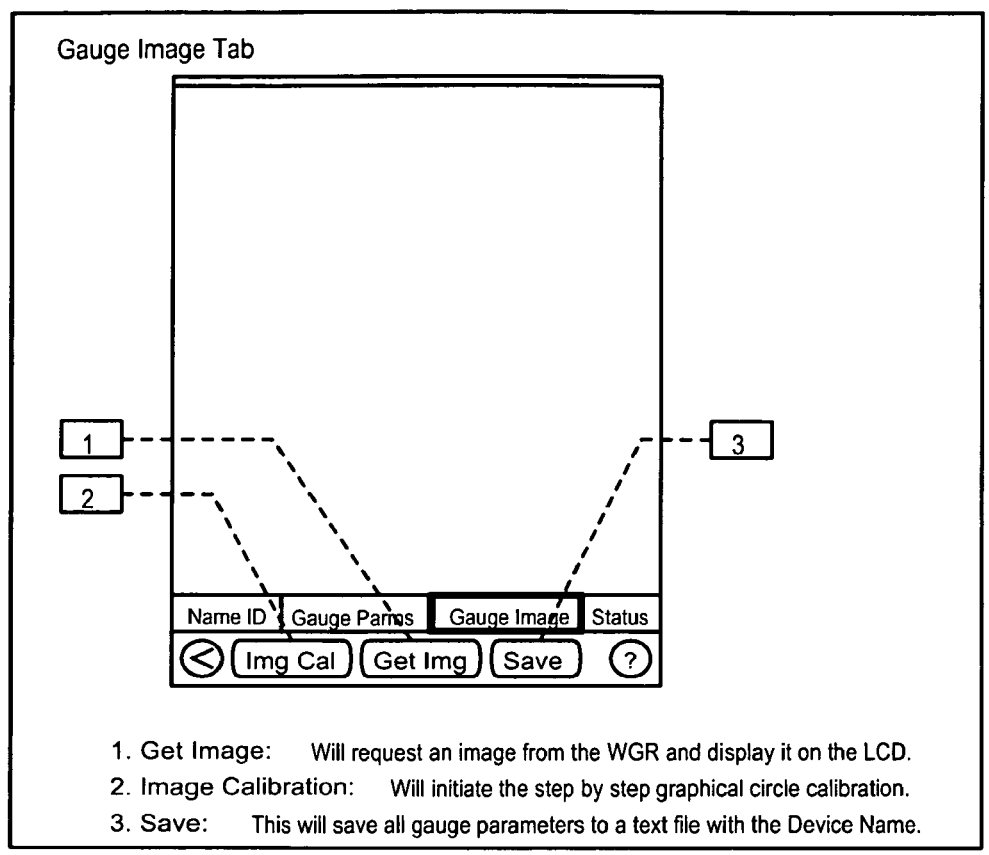
Figure 16H:
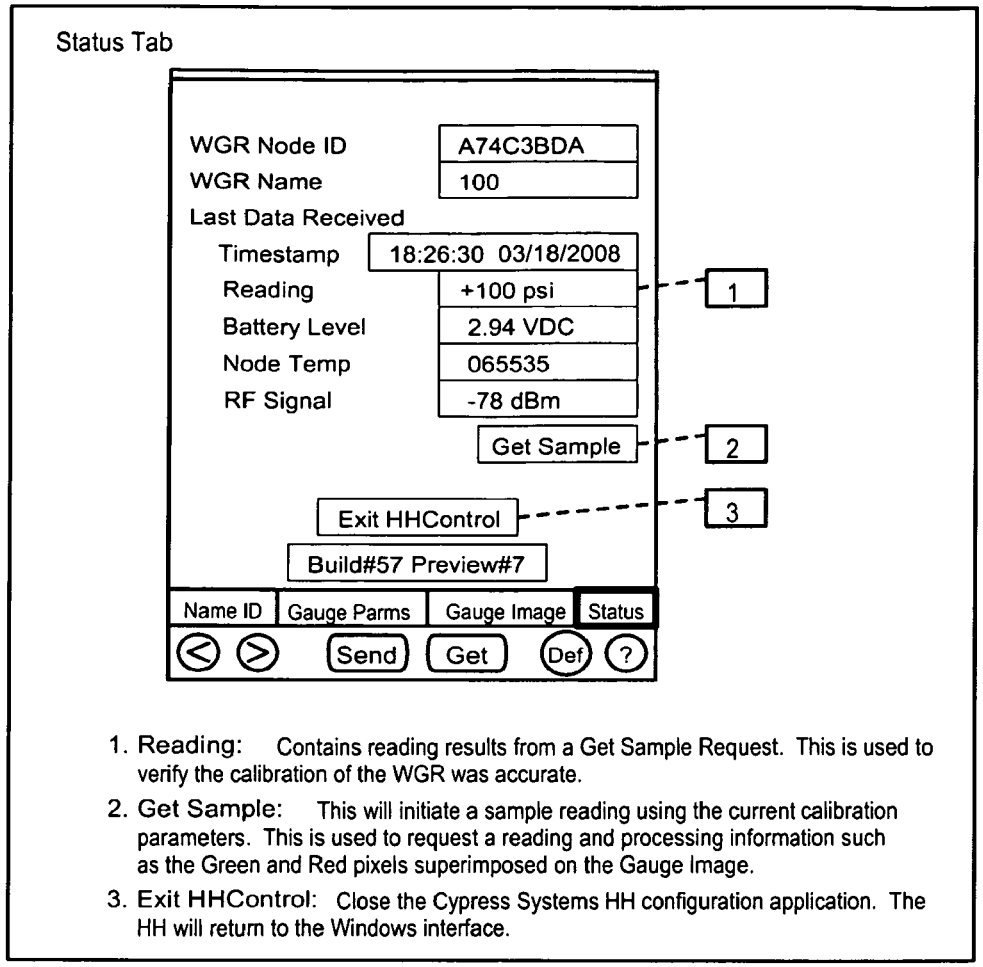

In the particular transfer function 1500 shown in FIG. 15, it is assumed that the configuration tool is in communication with another external device 1502. Such communication may be via a wired path or wireless path according to any of the ways noted above (e.g., wired USB, wirelessUSB, Firewire, 802.x, etc.). Further, for embodiments like that of FIG. 9, communication with the external device may be via a docking station 972.

If a user selects to download device configurations (Y from 1504), configurations may be selected for download (1506) and then sent to the external device (1508). In particular embodiments, configurations may be selected via a list that identifies the corresponding sense/control device and/or its particular piece of equipment. In other embodiments, such a feature may be automatic. That is, when a configuration tool is placed in a docking station or connected to an external system, an application may automatically download predetermined configuration data. Accordingly, control of downloads may be with commands entered via the configuration tool, via the external device, or both.

If a user selects to not to download device configurations (N from 1504), an option to download images may be presented. If such a downloading of images is desired (Y from 1510) images may be selected and downloaded (1512 and 1514). Such functions may be executed in the same manner as described above for device configurations. Of course, in alternate embodiments, images may be downloaded as part of the device configurations.

If a user selects to not to download device images (N from 1510), an option to upload device configuration or image data to the configuration tool may be presented. If such an uploading of data is desired (Y from 1516) device configuration(s) and/or image(s) may be selected and uploaded (1518, 1520 and 1522). Such functions may be executed in the same manner as described above for device configurations.

The ability to store and recall device configurations and/or images may allow one device configuration to be re-used by a configuration tool. For example when similar gauge is to be monitored, or a previously installed sense/control device is to be replaced, a previous set of configuration values may be used to calibrate the sense/control device. Further, storing images may allow calibrations to be verified and/or serve as reference points for other calibrations.

In this way, configuration data may be uploaded to or downloaded from a configuration tool.

Figure 17:
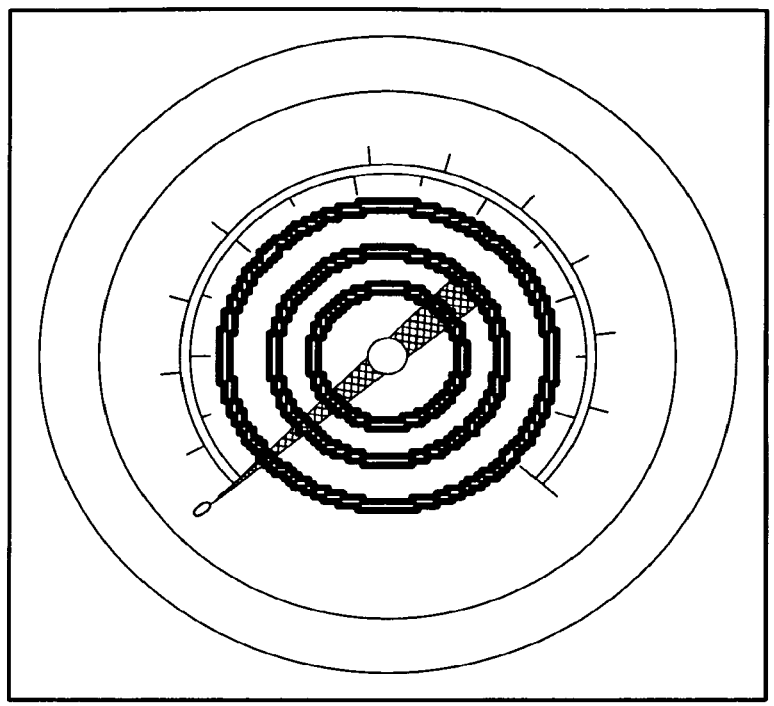
FIG. 17 is a diagram showing image processing circles superimposed on an acquired gauge image for a configuration tool, according to an embodiment.

FIGS. 16A to 16H show very particular examples of a configuration tool menu structure as implemented on handheld configuration tool. It is understood that such a menu structure may be stored within the handheld configuration tool. FIG. 17 shows image processing circles superimposed onto a gauge image.

A configuration tool may have greater computing capabilities than a sense/control device. In such cases, it may be desirable to include more computation intensive functions on a configuration tool. Examples of such functions will now be described.

Figure 18A:
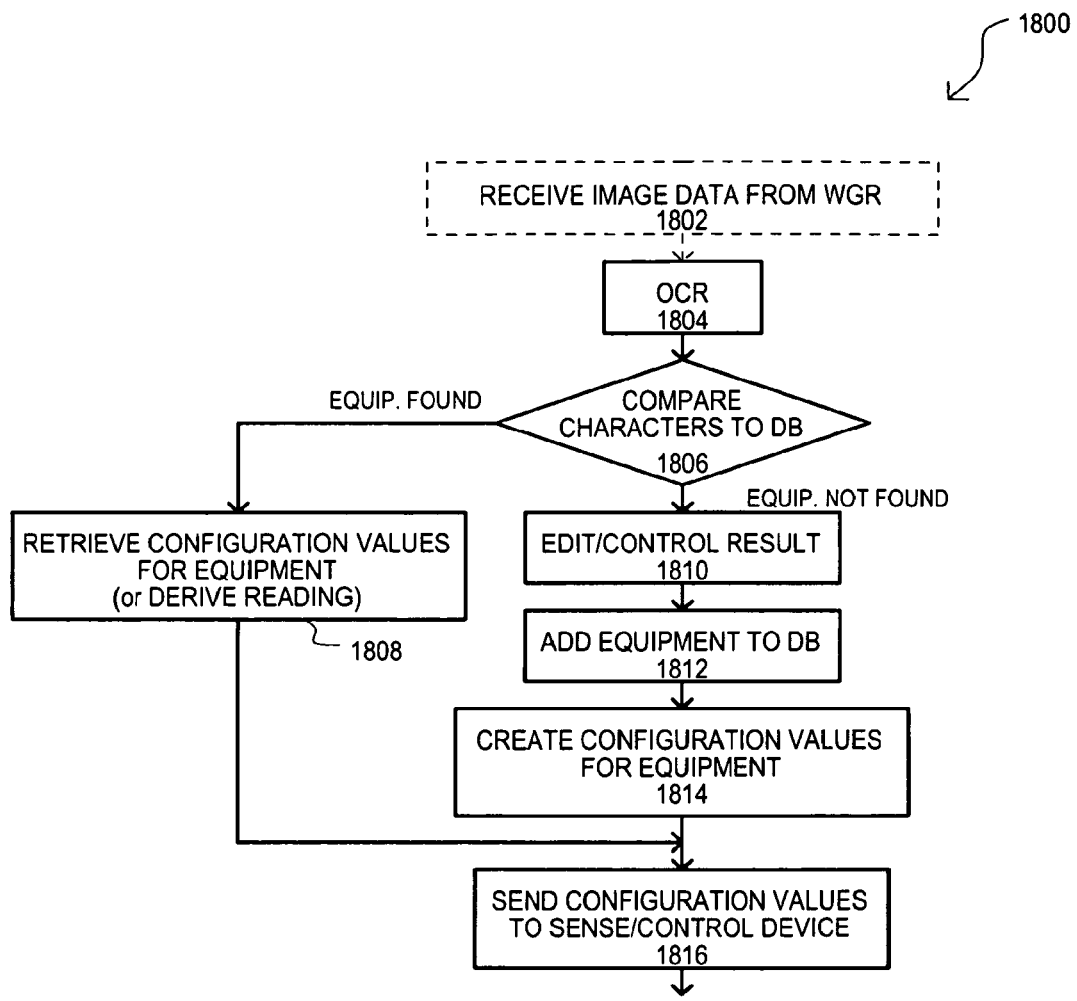
FIG. 18A to 18E show examples of configuration tool functions according to embodiments.

Referring to FIG. 18A, an optical character recognition (OCR) function for a configuration tool is shown in a flow diagram and designated by the general reference character 1800. The OCR function 1800 shown in FIG. 18A may include receiving image data from a sense control device (e.g. WGR) 1802. An OCR operation 1804 may be performed on the image to determine if the image includes any discernable characters. Results of an OCR step may be compared to a database 1806 stored within a configuration tool and/or accessed from remote server, or the like. If results from an OCR match a stored profile of the database (EQUIP. FOUND from 1806), configuration values corresponding to such a profile may be retrieved from the data base 1808. Alternatively, in the event the equipment displays a result in an alphanumeric form, the OCR step may derive the actual reading.

If, however, an OCR result does not match a profile in the database (EQUIP. NOT FOUND from 1806), a function may allow OCR results to be edited or otherwise altered 1810. For example, a user may be able to correct/add alphanumeric values or other symbols (e.g., decimal points). After such changes/additions, a resulting value may be entered into the database 1812 as a profile for the piece of equipment to which sense/control device is attached. Alternatively, in the event the equipment displays a result in an alphanumeric form, the result may be checked for accuracy.

From the edited OCR results, configuration values may be created 1814. This may be "manual" process requiring user input, or may be an automatic process the generates values based the edited values. A function 1800 may then send resulting configuration values (whether newly generated or retrieved from a database) to sense/control device 1816.

In this way, a configuration tool may include OCR capabilities for reading a 15 value and/or determine the type of equipment being imaged.

Figure 18B:
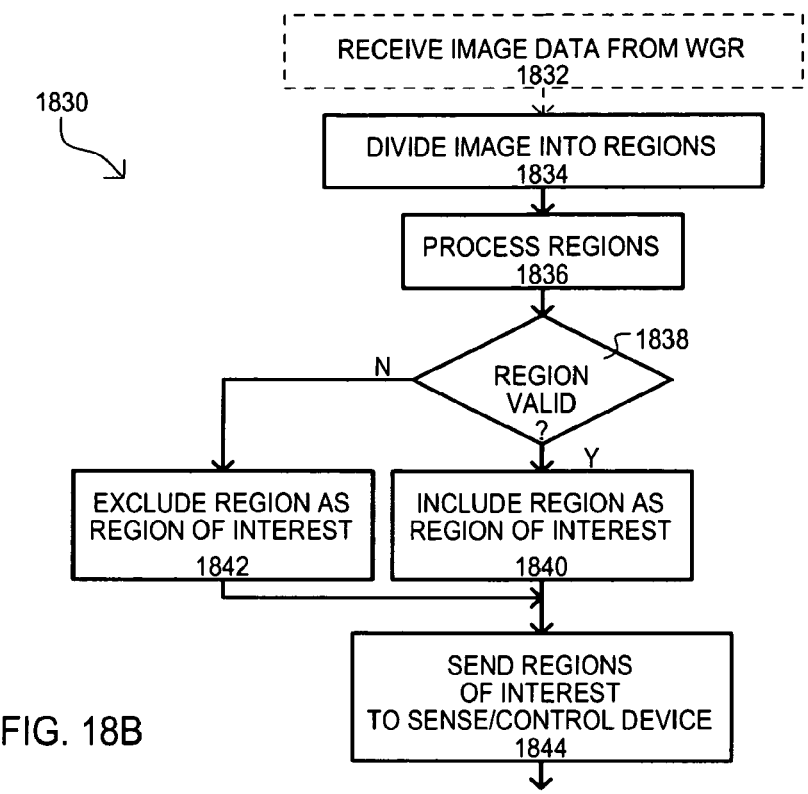

Referring to FIG. 18B, additional functions that may be performed by a configuration tool may include a pre-processing of the received image to better focus the image acquisition performed by a configured sense/control device. FIG. 18B shows an image pre-process function 1830 that may designate regions of interest, and then pass such regions on to a sense/control device to ensure that a sense/control device only samples regions likely to yield good information. In the very particular example of FIG. 18B, a pre-process function 1830 may include receiving an image from a sense/control device (e.g., WGR) 1832. Such an image may be divided into processing regions 1834. Such a feature may include dividing an image into rectangular, circular, annular, or other shaped regions depending upon the equipment being monitored or based on user selection. A configuration tool may process each region to determine its suitability for yielding valid data 1836. Such processing may include determining if regions have sufficiently contrasting portions, or meaningful data, or such regions suffer from too much noise, poor contrast, or feature crowding (e.g., excessive writing or hashmarks).

If a region is valid (Y from 1838), such a region may be designated as a region of interest 1840. Conversely, If a region is not valid (N from 1838), such a region may be excluded from being a region of interest 1842. Once regions of interest have been determined, such regions of interest may be sent to a sense/control device 1844.

In this way, more complex image processing functions may be performed by a configuration tool to optimize the areas dedicated for processing by a sense/control device.

Figure 18C:
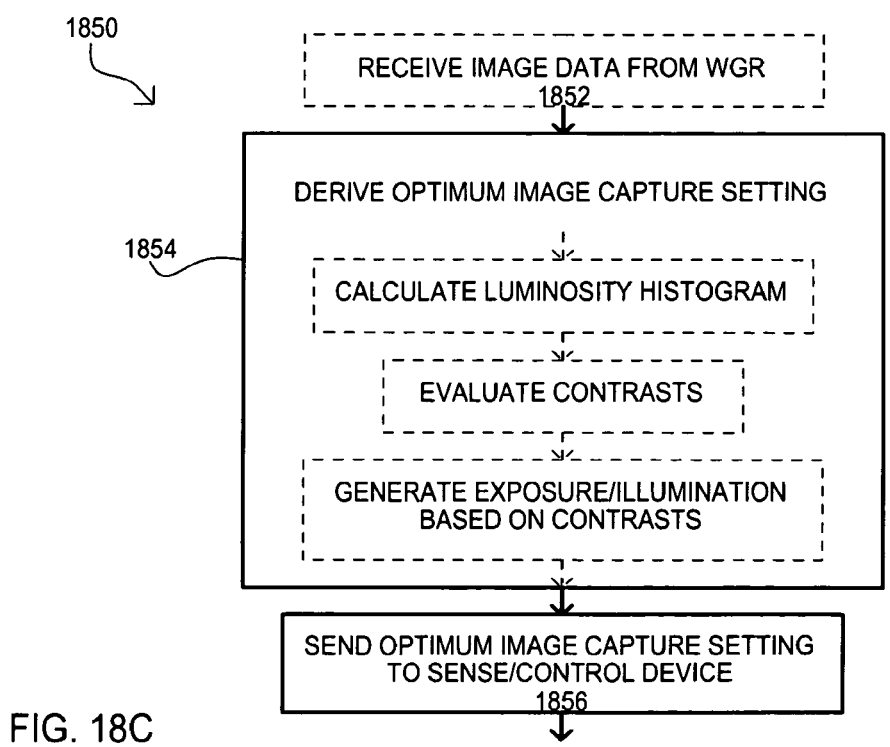

Referring to FIG. 18C, another higher processing power function is shown. Such a function may include determining optimum lighting conditions for a sense/control device. A function 1850 may include receiving an image from a sense/control device (e.g., WGR) 1852. According to the image data, a configuration tool may derive optimal image capture settings for the sense/control device 1854. In one very particular example, such a function may include calculating a luminosity histogram, evaluating resulting contrasts, and generating exposure and/or illumination intensity values from such an evaluation. Such optimized values may then be downloaded to the corresponding sense/control device 1856.

In this way, a configuration tool may include utilize greater computing power to optimize image acquisition settings for a sense/control device.

Figure 18D:
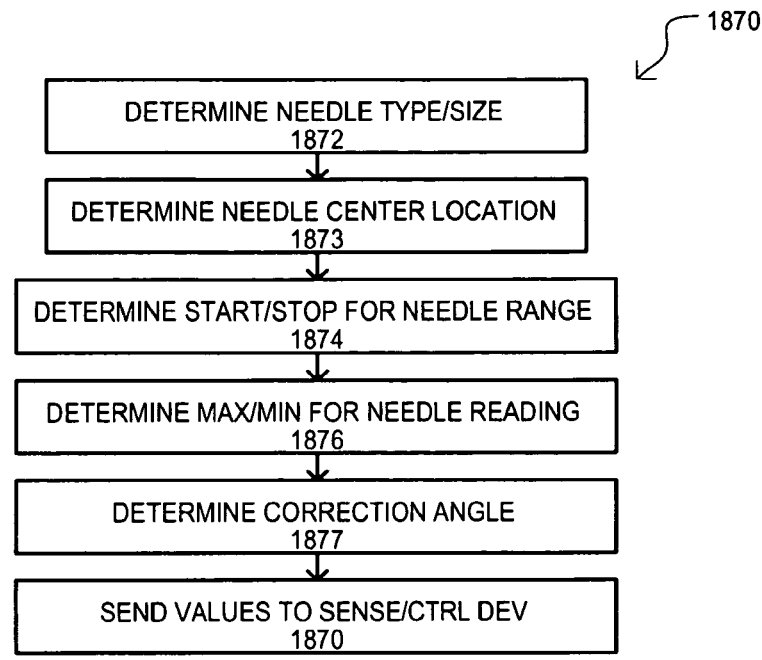

While embodiments above have shown arrangements in which a user may manually configure various values used to generate a reading, alternate embodiments may use the greater computing power of a configuration tool to generate all or a portion of such values automatically. One such example is shown in FIG. 18D. High level processing functions 1870 may include determining needle type/size 1872. Such a function may acquire a contiguous or almost contiguous region of predetermined size. More particularly, such a feature may determine if a needle has a "tail" (extends on both side of centerpoint), and if such a tail is thicker than, or the same size as the other portion of the needle. Included in such a function may be determining a needle center 1873. A function 1870 may also determine a start/stop position of a needle 1874. Such a function may extract an arc, or arc portion of a scale indicator. Maximum and minimum values may also be derived 1876. Such a function may detect "tick" marks, or the like, and corresponding scales/units. It is noted that this function may also utilize OCR to correlate detected values with tick positions.

Additional high level processing functions 1870 may include determining correction angle(s) 1877. In particular embodiments, such a feature may determine a tilt angle, as noted above. For example, detected horizontal text may indicate a 90° angle (angle perpendicular to gauge 0°). Such an approach may utilize OCR to extract text type and text orientation. As another example, a gauge 0° angle may be determined by determining the angle of a gap in a radial scale (e.g., absence of an arc or tick marks). A midway angle of this gap may be a gauge 0°. A difference between the gauge 0° and the monitoring device 0° may be the tilt angle. In addition or alternatively, a function 1877 may determine a needle rest angle. For example, an image processor may extract a resting post, or predetermined pattern indicating "dead" area in needle range. As but one example, see FIGS. 14A to 14C the pattern around the 0 psi measurement.

Finally, a function 1870 may send such configuration values to a sense/control device.

Figure 18E:
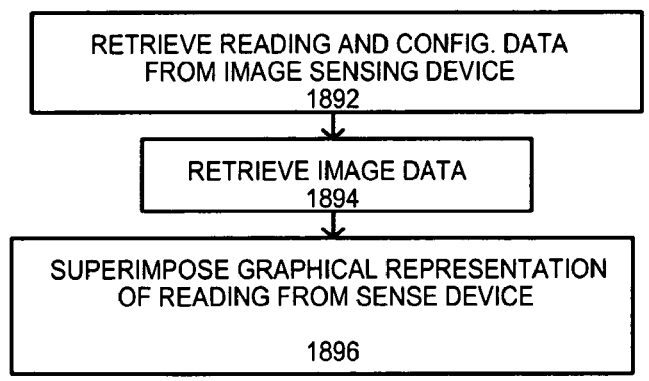

In this way, the greater computing power of a configuration tool may be used to automatically generate various configuration values for a sense/control device. Referring to FIG. 18E, one example of a visual reading confirmation function 1890 is shown in a flow diagram. A function 1890 may retrieve a reading and configuration data from an image sensing device 1892 as well as image data 1894. A function 1980 may then superimpose a graphic representation of the reading onto the received image 1896. As but one example, in the case of a sense/control device monitoring a needle position, such a function may superimpose a needle (of a different color) onto the gauge image. This may allow a user to rapidly, and simply confirm proper operation of the sense/control device. In this way, a function may provide a graphic reading for visual comparison with an actual display to confirm proper operation of a sense control device.

Receiver Examples

Particular examples of receivers will now be described.

Referring once again back to FIG. 1, a system 100 may include one or more digital receivers 106-0, analog receivers 106-1, or both. A digital receiver 106-0 may include a receiver controller 174, a server or other master monitor/control device 176 (hereinafter just "server"), and a transceiver 178. A digital receiver 106-0 may receive values (readings, alarms, etc.) from sense/control devices (102-0/1) and provide such values to server 176. A controller 174 may control communications between transceiver 178 and server 176.

In a preferred embodiment, a receiver transceiver 178 may includes two or more separate antennas and two or more corresponding radios for communicating on two separate channels in parallel. Such an arrangement, when utilized in combination with repeaters (e.g., 108) of the same configuration (having two or more antennas/radios) may result in a more reliable network. Such an arrangement may result in a system that does not require overly expensive sense/control devices. In particular, sense/control devices may have but one antenna/radio, with reliability being provided by repeaters/receivers with two or more antennas/radios. Multiple antenna/radios may provide frequency diversity and antenna diversity. Frequency diversity may provide two separate channels to help avoid interference from other transmitters. A corresponding sense/control device (102-0/1) may select the best channel from multiple channels provided by a receiver 106-0/1 (or repeater 108), and switch channels in the event a current channel experiences interference. Separate channels may also be more power efficient than more complex modulating schemes, such as frequency hopping spread spectrum (FHSS) type systems.

In such an arrangement, a receiver 106-0/1 may monitor sense/control 102-0/1 on multiple channels in parallel. This may provide low power consumption as compared to approaches that must switch between multiple channels according to a predetermined method/sequence.

Figure 19:
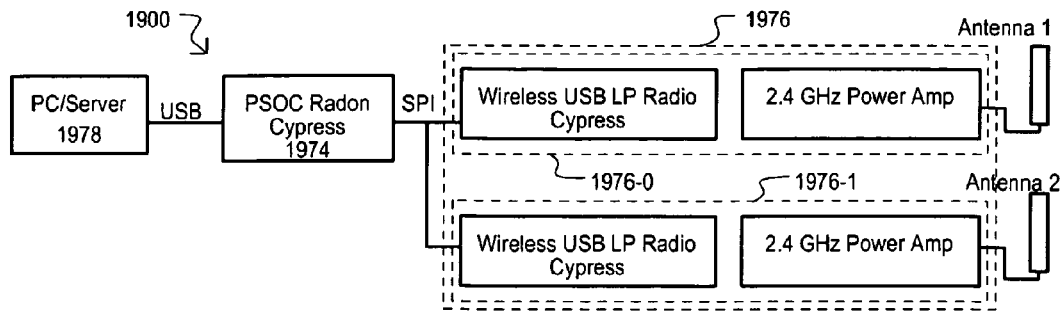
FIG. 19 is a block schematic diagram of a digital receiver according to an embodiment.

Receivers (106-0/1) may take various forms. One particular example of a digital receiver is shown in FIG. 19, and designated by the general reference character 1900. A digital receiver 1900 may have a receiver controller 1974 formed with a "Radon" family mixed signal controller CY8C24X94, manufactured by Cypress Semiconductor Corporation. In one arrangement, a receiver controller 1974 may perform a number of functions based on firmware routines, including but not limited to: controlling transceiver section 1976 and receiving data from and sending data to such a section. In addition, a receiver controller 1974 may communicate with a server 1978.

A transceiver section 1976 may include a first radio/amplifier pair 1976-0 that may be programmed to communicate via a first channel, and a second radio/amplifier pair 1976-1 that may be programmed to communicate via a second channel.

A server 1978 may be a specialized or general purpose computer system on which may operate applications for monitoring or controlling a system. A server 1978 may collect sense/control outputs, store configuration values for such devices, configure such devices, and/or actuate such devices. In the very particular example of FIG. 19, a controller 1974 may communicate with a transceiver section 1976 via an SPI type bus, and with a server 1978 via a USB type bus. Of course, this represents but one implementation.

Figure 20:
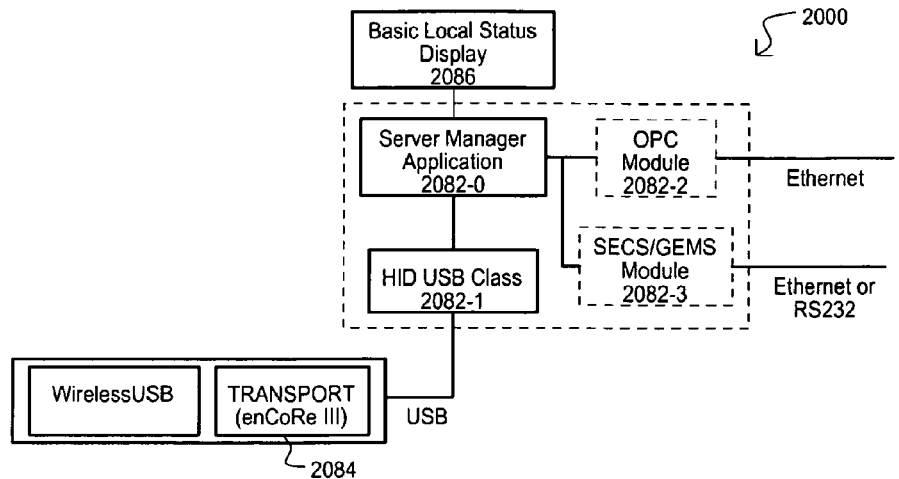
FIG. 20 is a diagram showing functional layers of a digital receiver according to an embodiment.

While a configuration tool may be conceptualized as including various components, a configuration tool may also be understood with reference to its executable functions. FIG. shows one example of a configuration tool 2000 as a series of functional layers. In the example shown, a configuration tool 2000 may include a server application 2082 and a server transmission layer 2084. In the particular example shown, a server application 2082 may include a server manager application 2082-0, a communication application 2082-1, and in the particular application shown, two possible industrial control applications 2082-2 and 2082-3. FIG. 20 also shows a local display function 2086.

A server manager application 2082-0 may receive values from, and send values to, repeaters and/or sense/control devices. Such values may be output via local display function 2086 and exchanged with industrial control applications (2082-2 and 2082-3). In the example shown, industrial control applications (2082-2 and 2082-3) may be include an OPC module and a SEC/GEMs module.

Figure 21:
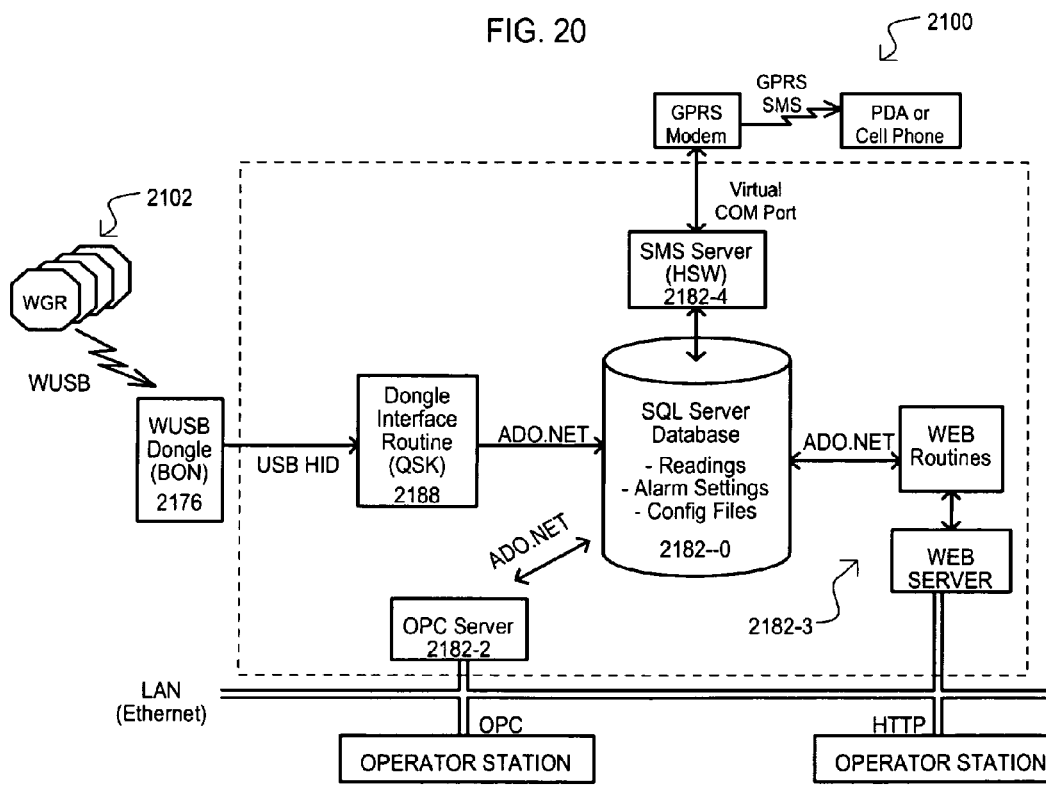
FIG. 21 is a block diagram if a digital receiver according to another embodiment.

Referring now to FIG. 21, a digital receiver according to yet another embodiment is shown in a block diagram, and designated by the general reference character 2100. A digital receiver 2100 may receive signals, in this case via a wirelessUSB protocol, from one or more sense/control devices 2102. Such signals may be received at a wirelessUSB "dongle" 2176 that is insertable to a computer system via a commonly used interface (in this case a USB interface). Such a dongle may include two radio transmitter receivers as shown in FIG. 19. A dongle interface 2188 may convert data into an application format, in this case compatible with ADO-.NET type software components. An SQL server database 2182-0 may store readings, settings, and/or configuration files for sense/control devices 2102. Database 2182-0 may be accessed with various other applications including an OPC server 2182-2, a web server 2182-3, and a mail server 2182-4. OPC server 2182-2 and web server 2182-3 may be accessed by a local network, which may connect to work stations. Mail server 2182-4 may provide messaging regarding the system to remote devices.

In this way, a digital receiver may provide easy access with server applications and other control or monitoring applications.

Referring back to FIG. 1, an analog digital receiver 106-1 may include a receiver controller 174', a control panel 176', and a transceiver 178'. An analog receiver 106-1 may receive values (readings, alarms, etc.) from sense/control devices (102-0/1) and provide such values to a control panel 176'. A control panel 176' may have inputs and provide outputs in analog format. A controller 174 may control communications between control panel 176' and transceiver 178'.

In a preferred embodiment, just like the transceiver 178 of the digital receiver 106-0, the transceiver 178' of analog transceiver 178 may include two or more separate antennas and two or more corresponding radios for communicating on two separate channels in parallel. This may produce various advancements in reliability and power consumption.

Figure 22:
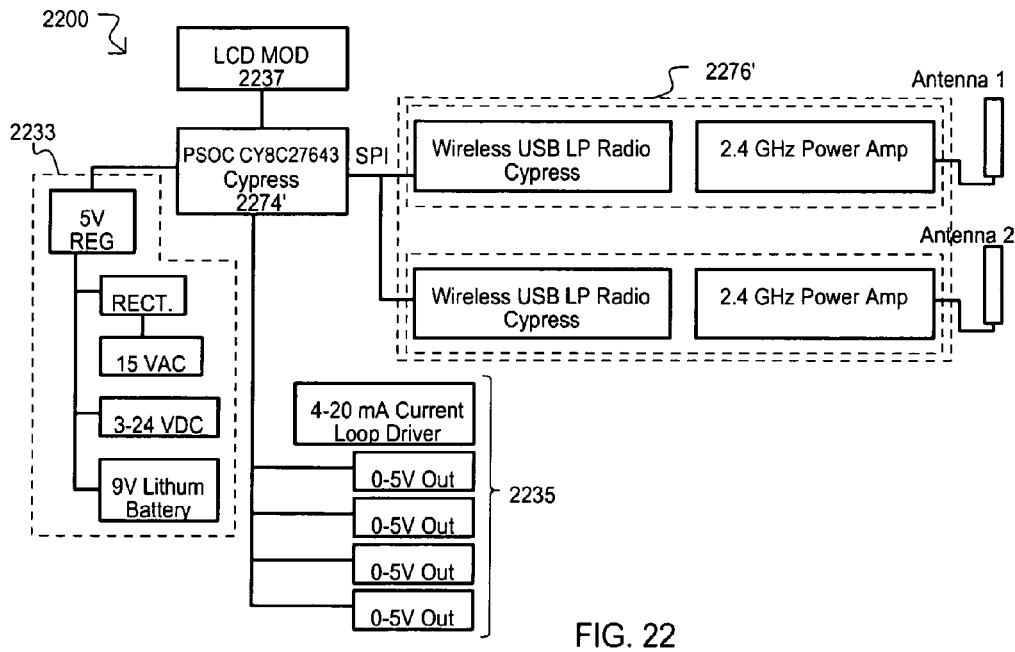
FIG. 22 is block diagram of an analog receiver according to an embodiment.

Referring now to FIG. 22, one very particular example of an analog receiver is shown in a block schematic diagram and designated by the general reference character 2200. In the particular example of FIG. 22, a receiver controller 2274' may be formed with a mixed signal controller CY8C27643, manufactured by Cypress Semiconductor Corporation. In one arrangement, a receiver controller 2274' may perform a number of functions based on firmware routines, including but not limited to: receiving values from transceiver section 2276', performing analog-to-digital conversion on such values, and providing such values at controller I/Os 2235. Conversely, in the case of a control application, a receiver controller 2274' may receive analog inputs via controller I/Os 2235, convert such values into digital form, and then forward such values to transceiver section 2276' for transmission.

Signals provided by receiver controller 2274' on controller I/Os 2235 may have the same format as legacy equipment. That is, deploying a system utilizing an analog controller 2200 may result in input or output values that are essentially same as would be generated if physical wiring was run from the monitored piece of equipment to a control panel.

A transceiver section 2276' may have the same construction as that shown in FIG. 19, having two separate monitored channels with two separate radios and antennas.

Analog receiver 2200 may have a power supply section 2233 that may accommodate various sources of power, including a 15 VAC power input, a 3-24 VDC input, and a 9V batter input. 15 VAC may be rectified prior to being applied to a 5 VDC regulator. 5 VDC regulator may provide a stable 5 VDC to controller 2274'.

In the example shown, controller I/Os 2235 shown may include various DC outputs, including 4-20 mA DC and four 0-5 VDC outputs. However, it is understood that alternate embodiments could receive control inputs in a similar fashion, or provide other suitable voltage output or inputs.

FIG. 22 shows that an analog receiver 2200 may optionally include a display module 2237. A display module 2237 may show status and/or values or signals to/from controller I/O 2235.

In this way, an analog receiver may convert values received from sense/control devices into analog control signals, such as those utilized by a legacy control system.

Repeater Examples

Particular examples of repeaters will now be described.

Referring once again back to FIG. 1, a system 100 may include one or more repeaters 108. A repeater 108 may include a repeater controller 188 and a repeater transceiver 190. A repeater 108 may provide a communication path between one or more sense/control devices (102-0/1) and a receiver (106-0 or 106-1).

In a preferred embodiment, a repeater transceiver 190 may have a multiple radio/antenna arrangement as described above for receivers 106-0/1. Thus, repeaters may provide the same frequency and antenna diversity. In one very particular arrangement, a repeater 108 may have a response delay to sense/control device communications that is intentionally greater than that indicated for a receiver (106-0 or 106-1). This may ensure that a receiver may distinguish between communications directly from a sense/control device (102-0/1) versus those forwarded by a repeater 108.

Figure 23:
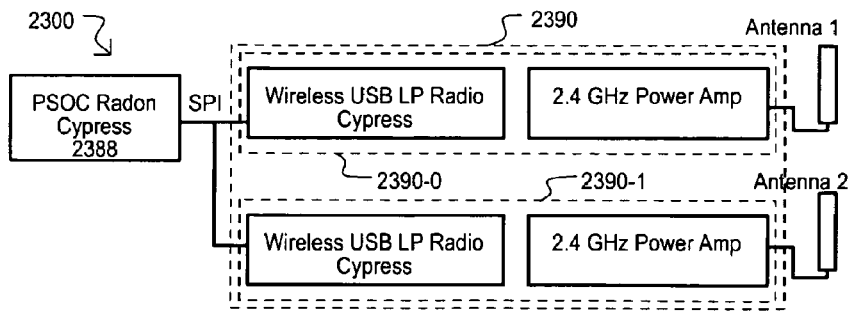
FIG. 23 is a block schematic diagram of a repeater according to an embodiment.

A repeater 108 may take various forms. One particular example of a repeater is shown in FIG. 23, and designated by the general reference character 2300. A repeater 2300 may include a repeater controller 2388 formed with a "Radon" family mixed signal controller CY8C24X94, manufactured by Cypress Semiconductor Corporation. Repeater controller 2388 may perform functions based on firmware routines, including but not limited to: controlling transceiver section 2390 and receiving data from and sending data to such a section.

A transceiver section 2390 may include a first radio/amplifier 2390-0 that may be programmed to communicate via a first channel, and a second radio/amplifier 2390-1 that may be programmed to communicate via a second channel.

In the very particular example of FIG. 23, a repeater controller 2388 may communicate with a transceiver section 2390 via an SPI type bus.

In this way, repeaters may extend the range of a communication link 20 between sense/control devices and a receiver.

Operations

Having described system, system components, and functions executable by such components, examples of system operations will now be described.

Figure 24A:
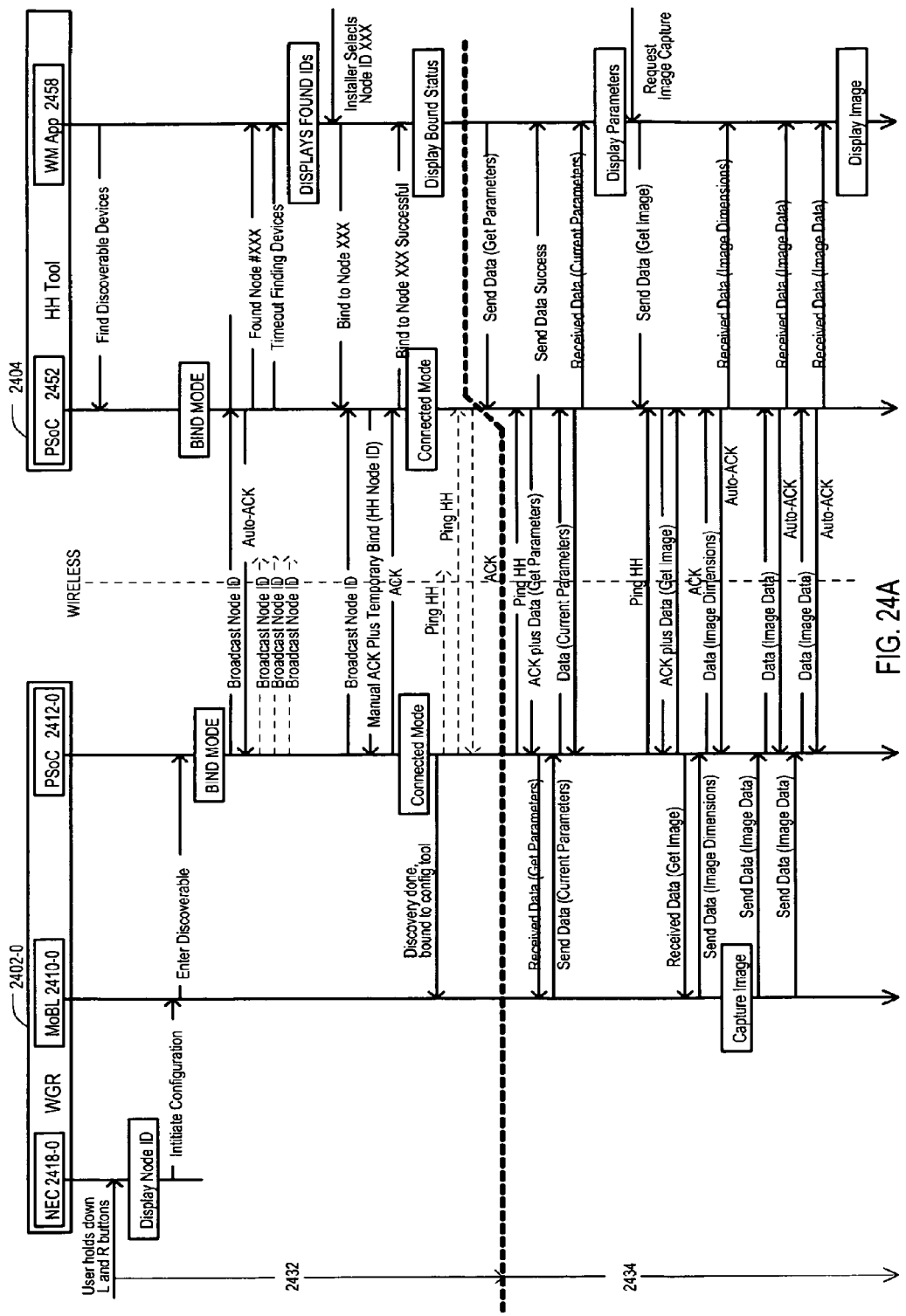
FIGS. 24A and 24B are diagrams showing system functions according to embodiments.
Figure 24B:
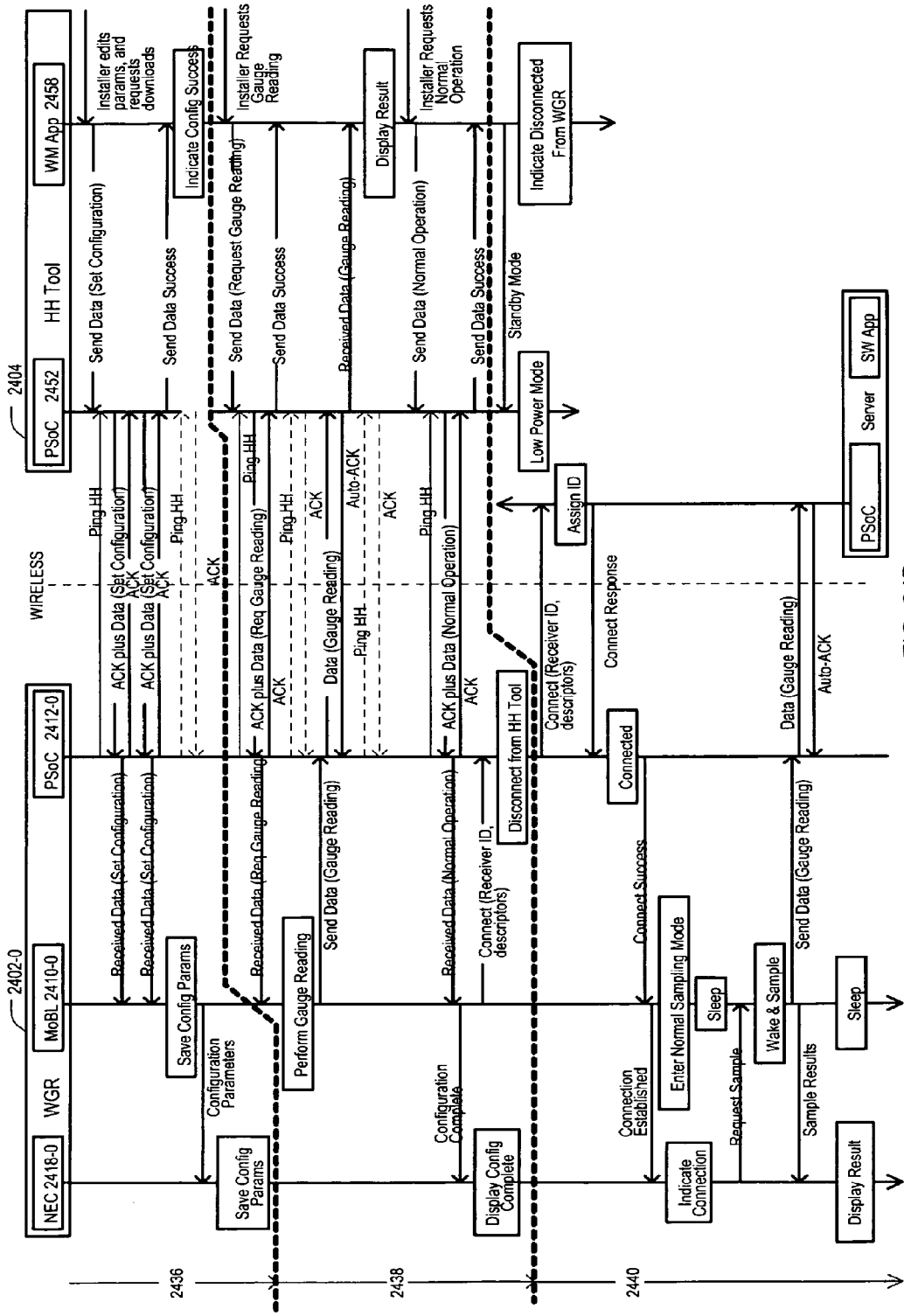

Referring to FIGS. 24A and 24B, various operations for a system like that shown in the above embodiments are represented by a messaging diagram. In FIGS. 24A and 24B, a sense/control device 2402-0 may be a WGR having a configuration like that of FIG. 5. A configuration tool 2404 may be a handheld configuration tool like that of FIG. 8. A receiver 2406-0 may be a digital receiver like that shown in FIG. 19. The lines extending vertically from each component indicate a function performed by such a component.

FIGS. 24A and 24B show a bind to configuration tool operation 2432, a configuration operation 2434, a configuration confirmation operation 2436, and a bind to receiver (or repeater) operation 2440. In a bind to configuration tool operation 2342, sense control device 2402-0 may enter a discoverable (e.g., acquisition mode) while a configuration tool 2404 may enter a monitoring mode. Such devices may then bind to one another through the series of data transmissions and acknowledgement, as shown.

A configuration operation 2434 may include a configuration tool 2404 requesting configuration parameters, and a sense/control device 2402-0 returning such parameters. A configuration tool 2404 may then request image data, and a sense/control device 2402-0 may send such image data for display on the configuration tool 2404. Parameters may be edited/modified and then sent back to sense/control device 2402-0, which may store such parameters.

Referring to FIG. 24B, a configuration confirmation operation 2436 may include a configuration tool 2404 requesting a reading from a sense/control device 2402-0. A sense/control device 2402-0 may generate a reading based on its currently stored parameters, and send such a reading to configuration tool 2404. If such a reading is acceptable, a configuration tool 2404 may place a sense/control device 2402-0 into a normal mode of operation.

A bind to receiver (or repeater) operation 2438 may allow a receiver 2406-0 to detect a sense/control device 2402-0 in a "normal" operation and bind to it. A sense/control device 2402-0 may periodically wake, take a sample, and transmit it to a receiver or repeater.

In this way, a system may include ways of binding sense/control devices to configuration tools, configuring such devices with the configuration tool, and then binding the sense/control device to a receiver.

While communication methods may take various format, examples of a wireless data communication packet formats are shown in FIGS. 25A to 25F in a number of diagrams. Each diagram shows three protocol layers, including an application message layer, a device to transceiver layer, and a transmission layer.

Figure 25A:
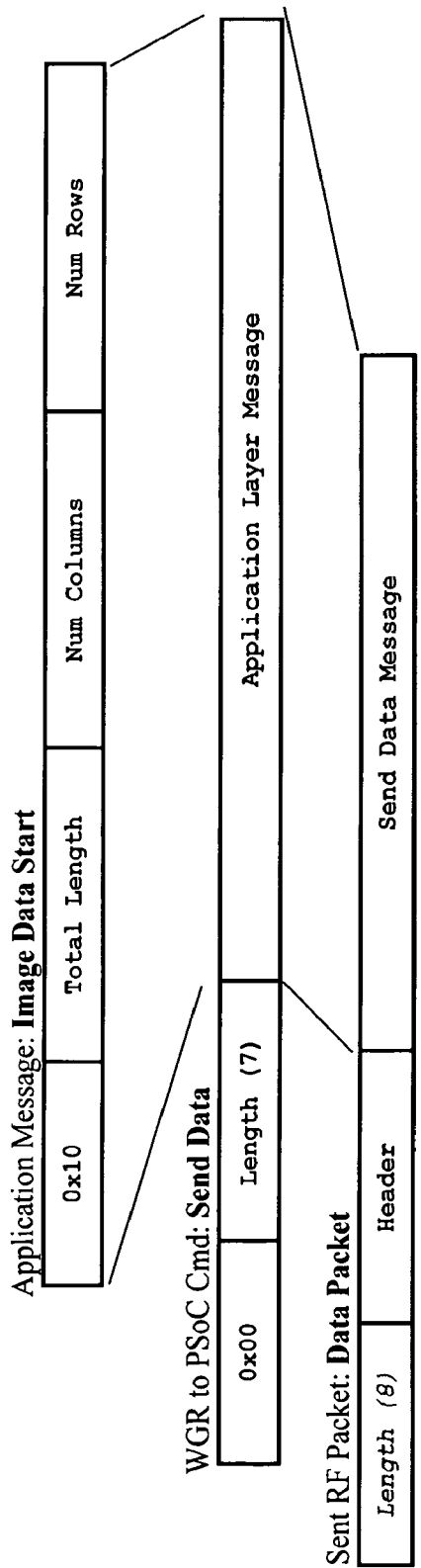
FIGS. 25A to 25F are diagrams showing data packet formats according to various embodiments.
Figure 25B:
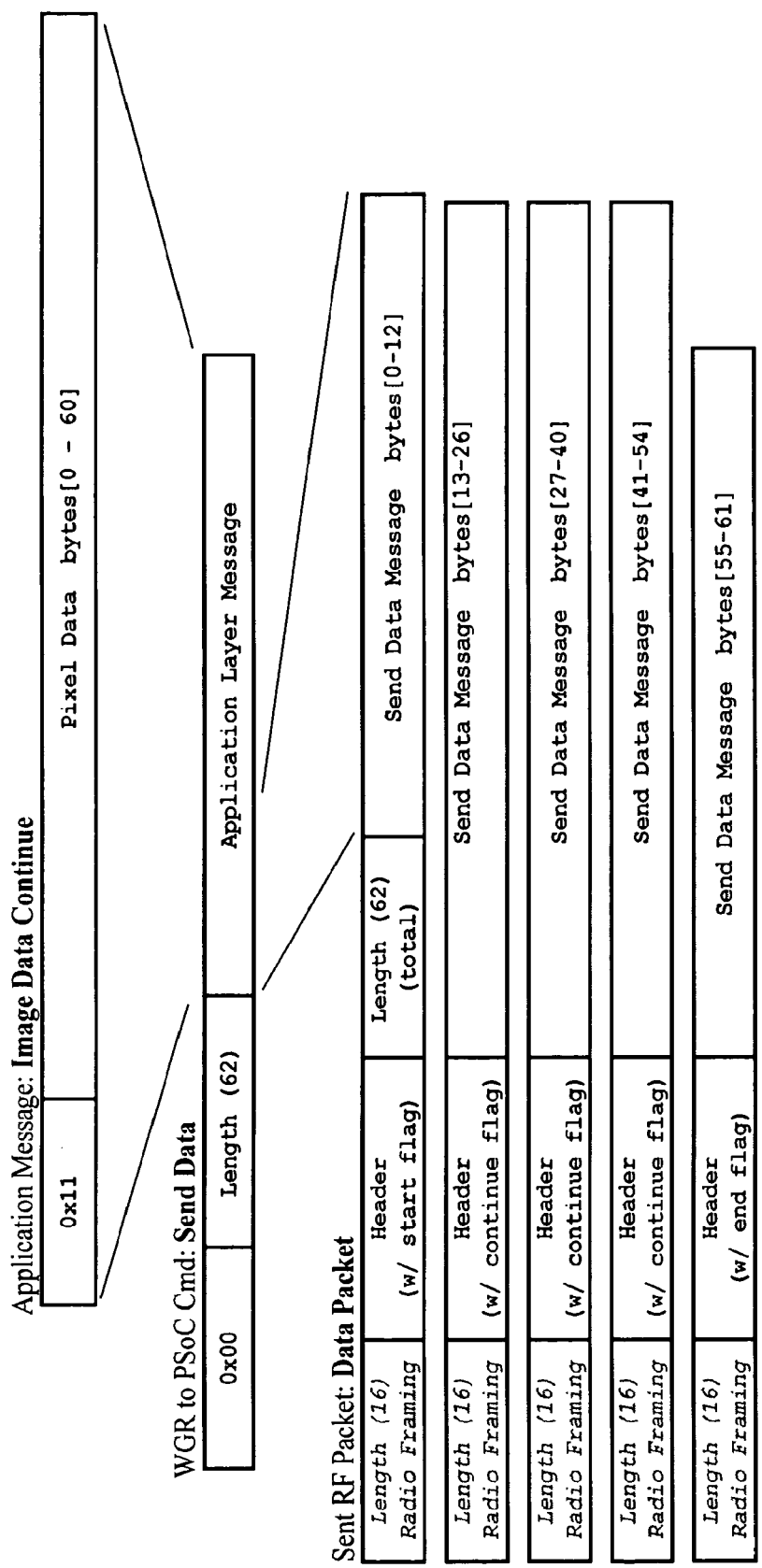
Figure 25C:
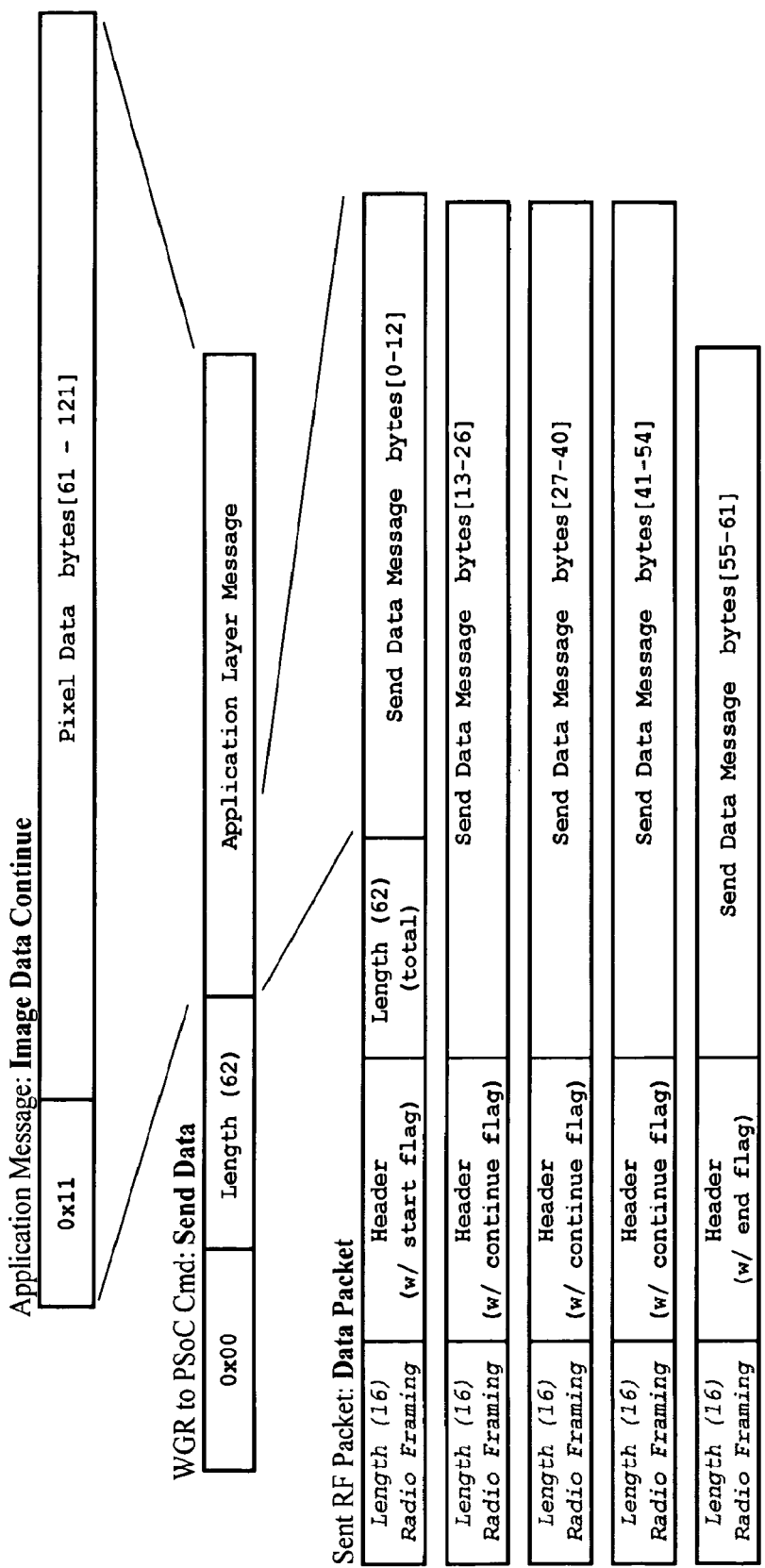

FIGS. 25A-25C show an example of the packetizing of image data from a sense/control device (WGR). Referring to FIG. 25A, at the start of such a transmission, an application message layer may indicate a size/format of an image (e.g., number of columns/rows). As shown in FIG. 25B-25C, following the start of the transmission, the actual picture data (e.g., pixels) may be included as data.

Figure 25D:
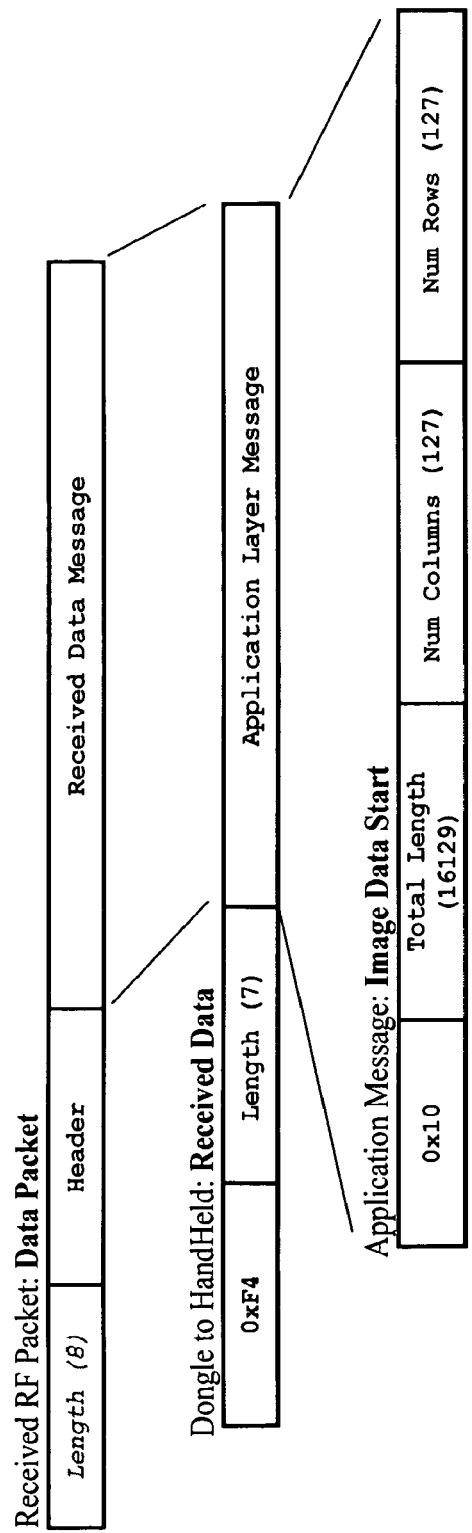
Figure 25E:
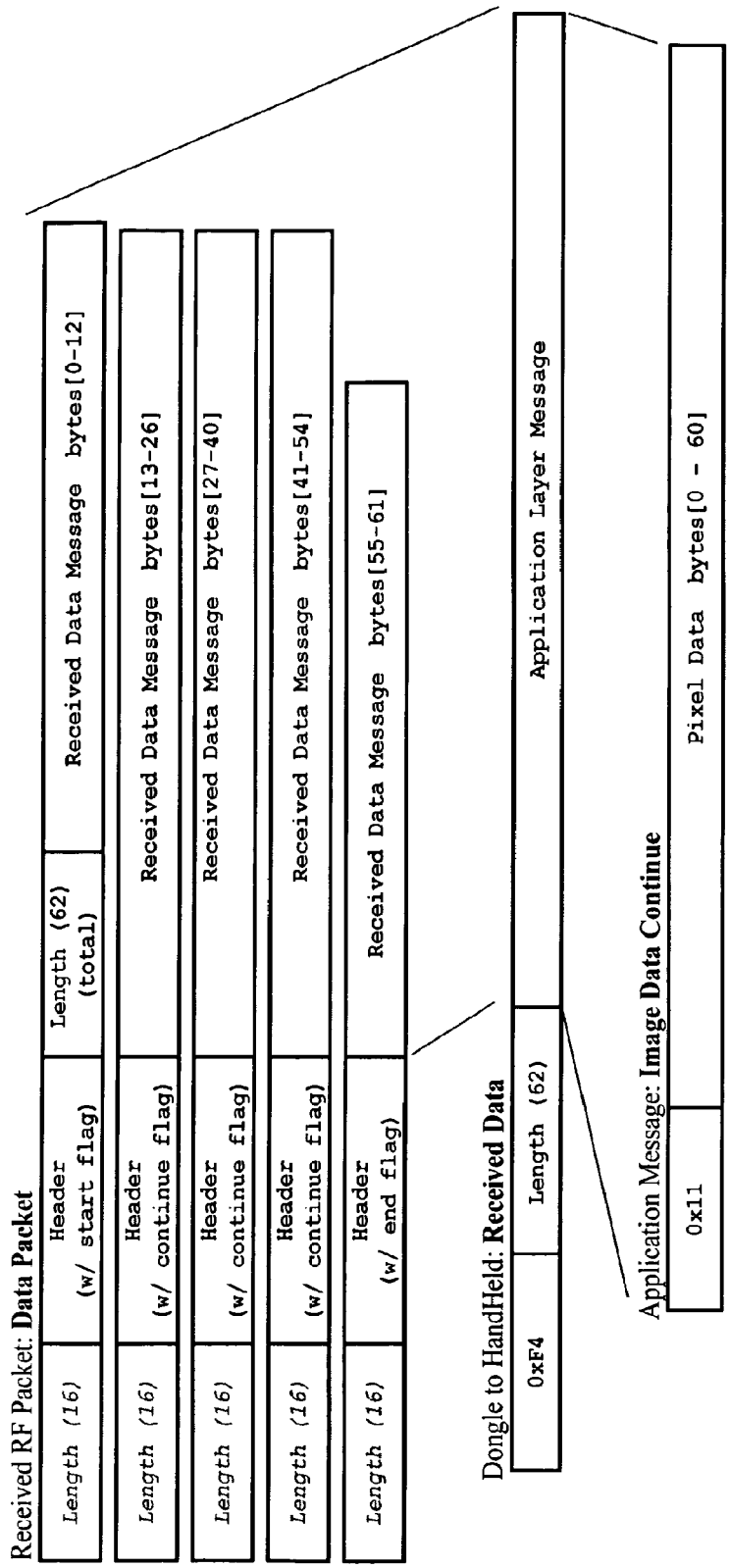

FIGS. 25D and 25E show packet de-packetizing by a receiving device, such as a configuration tool and/or receiver.

Figure 25F:
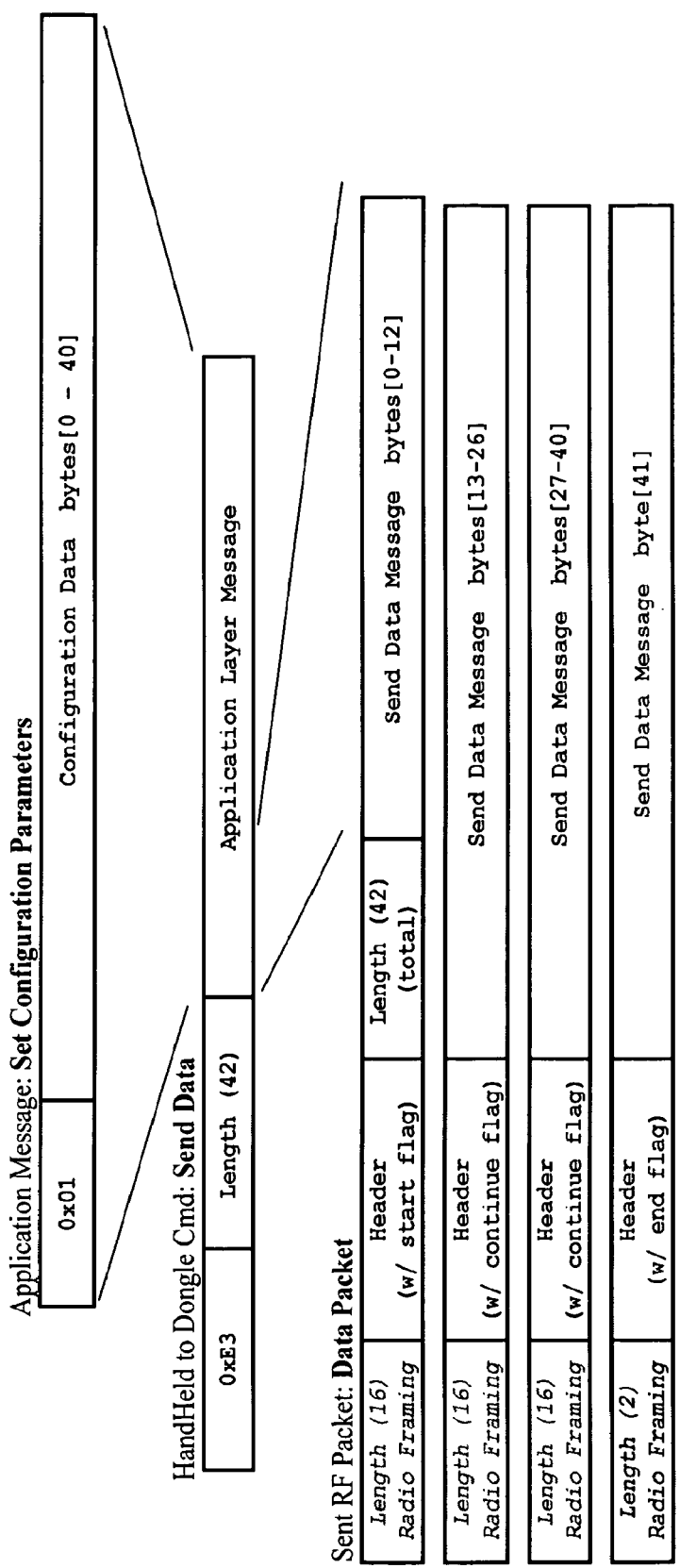

FIG. 25F shows an example of the packetizing of configuration data for transmission from a configuration device to a sense/control device.

Referring now to FIG. 26 one example of a wireless transmission packet header is shown. Such a header may include various fields. A "Repeater Bit" field may indicate whether the packet is received from a receiver or a repeater as but one example. Type fields ("Type2", "Type1" and "Type0") may indicate a particular type of packet being sent (e.g., data, control, communication acknowledge ACK, etc.). A "Sequence Bit" field may indicate a sequence of a packet in session by toggling between values. Flag fields ("Flag1", "Flag0") may indicate a packet's position in a particular transmission set. For example, such fields may indicate a "Normal" Packet (packet having message contained in one packet), a "Continue Packet" (a packet that follows a start packet), a "Start Packet" (a packet that indicates it is the first of a multiple packet set), and an "End Packet" (a packet that indicates the end of a packet group).

FIG. 27 shows one example of a broadcast packet that may be periodically transmitted by a wireless sense/control device in an acquisition mode. Such a packet may include a "Node1D" field that may identify the node assigned to the sense/control device. A "WGR" field may identify a version of a sense/control device (i.e., firmware version). A "Product ID" field may identify a particular type of sense/control device.

In this way, communications between sense/control devices and receivers may have particular formats.

It should be appreciated that in the foregoing description of example embodiments, various features are sometimes grouped together in a single embodiment, figure, or description thereof for the purpose of streamlining the disclosure aiding in the understanding of one or more of the various aspects. This method of disclosure, however, is not to be interpreted as reflecting an intention that more features than are expressly recited in each claim are specified. Thus, the claims following the detailed description are hereby expressly incorporated into this detailed description, with each claim standing on its own as a separate embodiment.

It is also understood that the embodiments may be practiced in the absence of an element and/or step not specifically disclosed. That is, a feature may include elimination of an element.

Accordingly, while the various aspects of the particular embodiments set forth herein have been described in detail, the present disclosure could be subject to various changes, substitutions, and alterations without departing from the spirit and scope disclosed herein.

What is claimed is:

1. A system for monitoring equipment comprising:
a configuration tool comprising communication circuitry that communicates with at least one sense or control device and receives data acquired by the at least one sense or control device of equipment to which the at least one sense or control device is attached, and transmits configuration data to the at least one sense or control device that controls how data is acquired by the at least one sense or control device,
processing circuitry coupled to the communication circuitry; and
instruction memory coupled to the processing circuitry, wherein the processing circuitry is configured to execute instructions stored in the instruction memory to display any sense or control devices within detectable range of the configuration tool.

2. The system of claim 1, wherein the data acquired by the at least one sense or control device includes image data, and wherein the processing circuitry and corresponding instruction memory are configured to superimpose image processing regions onto the image captured by the at least one sense or control device.

3. The system of claim 2, wherein the image processing regions are alterable in response to user inputs to the configuration tool.

4. The system of claim 1, wherein the data acquired by the at least one sense or control device corresponds to an analog electrical signal, and wherein the configuration data is configured to control how the at least one sense or control device generates a reading from the analog electrical signal.

5. The system of claim 1, wherein the configuration tool further comprises a memory to store configuration values of a plurality of sense or control devices.

6. A method, comprising:
- in a standard mode, periodically emitting a transmission from a sense or control device that indicates an operating state of a piece of equipment to which the sense or control device is attached;
- receiving the transmissions at a receiver device situated remotely from the sense or control device;
- in a configuration mode, configuring the sense or control device with configuration values that determine how the operating state is generated;
- wherein the sense or control device generates a reading from an image of the equipment; and
- wherein in the configuration mode, displaying an image acquired by the sense or control device on a configuration tool separate from the receiver, and modifying configuration values according to such image data.

7. The method of claim 6, wherein the transmission is a wireless transmission and wherein the sense or control device is configured via wireless communication channel.

8. A configuration tool, comprising
- a memory to store instructions;
- communication circuitry;
- a processor coupled to the memory and the communication circuitry, wherein the processor is configured to execute instructions to communicate with a device attached to monitor or control a piece of equipment using the communication circuitry, wherein the processor is configured to receive data about a state of the piece of equipment from the device using the communication circuitry, and wherein the processor is configured to transmit configuration data to the device using the communication circuitry, wherein the configuration data is configured to control how additional data about the state of the piece of equipment is to be acquired; and
- wherein the processor is configured to verify operation of the device after transmitting the configuration data to the device.

9. The configuration tool of claim 8, wherein the configuration tool is at least one of a handheld device, a laptop computer, or a personal computer.

10. The configuration tool of claim 8, further comprising a touch screen.

11. The configuration tool of claim 8, wherein the processor is configured to communicate with the device via at least one of receivers or repeaters, and wherein the processor is configured to configure the at least one of the receivers or repeaters.

12. The configuration tool of claim 8, wherein the processor is configured to read and write configuration parameters directly from the device.

13. The configuration tool of claim 8, wherein the processor is configured to assign configuration parameters to the device, wherein the configuration parameters comprise at least one of a sample rate at which the device examines the piece of equipment, calibration offsets introduced in determining a reading of the piece of equipment, unit values for scaling the reading of the piece of equipment, maximum and minimum limits for a reading of the piece of equipment, a needle direction, a gauge tilt angle, exposure time, light intensity, or image processing parameters.

14. The configuration tool of claim 8, wherein the communication circuitry comprises wireless communication circuitry, and wherein the processor is configured to wirelessly communicate with the device.

15. The configuration tool of claim 8, wherein the processor is configured to receive from the device an identifier of the device.

16. The configuration tool of claim 8, further comprising a display, wherein the processor is configured to generate a list of available devices attached to monitor or control pieces of equipment and generate a graphical user interface to display the list of available devices and allow selection of one or more of the available devices in the list, and wherein the processor is configured to initiate a bind operation with the one or more selected devices.

17. The configuration tool of claim 8, wherein the processor is configured to determine a first signal strength between the device and another device and a second signal strength between the device and the configuration tool, and to select a communication path based on the first and second signal strengths.

18. The configuration tool of claim 8, wherein the processor is configured to receive image data as the data received from the device.

19. The configuration tool of claim 8, wherein the processor is configured to store the received data about the state of the piece of equipment in the memory.

20. The configuration tool of claim 8, further comprising a docking station interface for connection to a docking station configured to provide a communication path to another device.

21. The configuration tool of claim 8, wherein the processor is configured to communicate the received data to another device, wherein the received data comprises at least one of configuration parameters and image data.

22. The configuration tool of claim 8, wherein the processor is configured to receive image data for the received data, and wherein the processor is configured to superimpose processing regions on the image data.

23. The configuration tool of claim 22, wherein the processor is configured to receive input from a user and to adjust the processing regions to define or adjust at least one of a center point, an angle, or a region of interest.

24. The configuration tool of claim 8, wherein the processor is configured to receive image data for the received data, and wherein the processor is configured to execute image processing operations to process the image data.

25. The configuration tool of claim 8, wherein the processor is configured to emulate image processing by the device to determine optimum configuration parameters for the configuration parameters.

26. The configuration tool of claim 8, wherein the processor is configured to receive image data for the received data, and wherein the processor is configured to verify the operation of the device by superimposing a digital reading onto the image

* * * * *